(12) United States Patent
Seregin et al.

(10) Patent No.: US 11,785,205 B2
(45) Date of Patent: Oct. 10, 2023

(54) SHARED DECODER PICTURE BUFFER FOR MULTIPLE LAYERS

(71) Applicant: QUALCOMM Incorporated, San Diego, CA (US)

(72) Inventors: Vadim Seregin, San Diego, CA (US); Adarsh Krishnan Ramasubramonian, Irvine, CA (US); Muhammed Zeyd Coban, Carlsbad, CA (US)

(73) Assignee: QUALCOMM Incorporated, San Diego, CA (US)

( * ) Notice: Subject to any disclaimer, the term of this patent is extended or adjusted under 35 U.S.C. 154(b) by 38 days.

(21) Appl. No.: 17/128,767

(22) Filed: Dec. 21, 2020

(65) Prior Publication Data
US 2021/0195175 A1    Jun. 24, 2021

Related U.S. Application Data

(60) Provisional application No. 62/953,394, filed on Dec. 24, 2019.

(51) Int. Cl.
*H04N 19/433*    (2014.01)
*H04N 19/105*    (2014.01)
(Continued)

(52) U.S. Cl.
CPC ......... *H04N 19/105* (2014.11); *H04N 19/139* (2014.11); *H04N 19/172* (2014.11); *H04N 19/30* (2014.11); *H04N 19/44* (2014.11)

(58) Field of Classification Search
CPC .. H04N 19/105; H04N 19/139; H04N 19/172; H04N 19/30; H04N 19/44
See application file for complete search history.

(56) References Cited

U.S. PATENT DOCUMENTS

| 2015/0016500 A1* | 1/2015 | Seregin | H04N 19/61 |
| | | | 375/240.02 |
| 2015/0172655 A1* | 6/2015 | Hendry | H04N 19/597 |
| | | | 375/240.02 |

(Continued)

FOREIGN PATENT DOCUMENTS

WO    2015052943 A1    4/2015

OTHER PUBLICATIONS

Bross B., et al., "Versatile Video Coding (Draft 7)," 16th JVET Meeting, Oct. 1, 2019-Oct. 11, 2019, Geneva, (The Joint Video Exploration Team of ISO/IEC JTC1/SC29/WG11 and ITU-T SG. 16 WP 3), No. JVET-P2001-vE, Nov. 12, 2019 (Nov. 12, 2019), XP030224328, 494 pages, Retrieved from the Internet: URL: http://phenix.int-evry.fr/jvet/doc_end_user/documents/16_Geneva/wg11/JVET-P2001-v14.zip JVET-P2001-vC.docx , [retrieved Nov. 12, 2019], paragraphs [9.3.3.2], [9.3.3.6], [9.3.3.14], table 124.

(Continued)

*Primary Examiner* — William C Vaughn, Jr.
*Assistant Examiner* — Naod W Belai
(74) *Attorney, Agent, or Firm* — QUALCOMM Incorporated; Espartaco Diaz Hidalgo

(57) ABSTRACT

A video decoder for decoding multi-layer video data can be configured to maintain a decoded picture buffer (DPB) for storing reference pictures for a plurality of layers, wherein the plurality of layers comprise at least a first layer and a second layer; prior to decoding a current picture of an access unit of the first layer, perform a picture output and removal process on the DPB, wherein to perform the picture output and removal process on the DPB, the one or more processors are further configured to remove from the DPB only decoded pictures that belong to the first layer; and after removing a last decoding unit of the current picture from a (Continued)

coded picture buffer (CPB), perform a picture bumping process across all layers of the DPB.

26 Claims, 7 Drawing Sheets

(51) Int. Cl.
*H04N 19/44* (2014.01)
*H04N 19/172* (2014.01)
*H04N 19/139* (2014.01)
*H04N 19/30* (2014.01)

(56) References Cited

U.S. PATENT DOCUMENTS

| | | | | |
|---|---|---|---|---|
| 2015/0229945 | A1* | 8/2015 | Nakagami | H04N 19/436 |
| | | | | 375/240.16 |
| 2016/0044324 | A1* | 2/2016 | Deshpande | H04N 19/44 |
| | | | | 375/240.25 |
| 2016/0366428 | A1* | 12/2016 | Deshpande | H04N 19/30 |
| 2020/0389659 | A1* | 12/2020 | Seregin | H04N 19/187 |

OTHER PUBLICATIONS

Hendry., "[AHG9]: On DPB Parameter for Output Layer Set," JVET-Q0308, Joint Video Experts Team (JVET) of ITU-T SG 16 WP 3 and ISO/IEC JTC 1/SC 29/WG 11, 17th Meeting, Brussels, BE, Jan. 7-17, 2020, pp. 1-3.
International Search Report and Written Opinion—PCT/US2020/066583—ISA/EPO—dated Apr. 13, 2021 12 Pages.
ITU-T H.265, Series H: Audiovisual and Multimedia Systems, Infrastructure of Audiovisual Services—Coding of Moving Video, High Efficiency Video Coding, The International Telecommunication Union, Jun. 2019, 696 Pages.
Seregin (Qualcomm) V., et al., "AHG8: Clarification on DPB Structure and Picture Output," 17th JVET Meeting, Jan. 7, 2020-Jan. 17, 2020, Brussels, (The Joint Video Exploration Team of ISO/IEC JTC1/SC29/WG11 and ITU-T SG.16), No. JVET-Q0158, m51747, Dec. 28, 2019 (Dec. 28, 2019), XP030222726, pp. 1-5, Retrieved from the Internet: URL:http://phenix.int-evry.fr/jvet/doc_end_user/documents/17_Brussels/wg11/JVET-Q0158-v1.zip JVET-Q0158.docx [retrieved on Dec. 28, 2019] Section 2 Proposal.
Seregin V., et al., "AHG8/AHG9: DPB Structure and Picture Output", JVET-Q0814-v2, Joint Video Experts Team (JVET) of ITU-T SG 16 WP 3 and ISO/IEC JTC 1/SC 29/WG 11, 17th Meeting, Brussels, BE, Jan. 7-17, 2020, pp. 1-2.

* cited by examiner

SHARED DECODER PICTURE BUFFER FOR MULTIPLE LAYERS

This application claims the benefit of U.S. Provisional Patent Application 62/953,394, filed 24 Dec. 2019, the entire content being incorporated herein by reference.

TECHNICAL FIELD

This disclosure relates to video encoding and video decoding.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video coding techniques, such as those described in the standards defined by MPEG-2, MPEG-4, ITU-T H.263, ITU-T H.264/MPEG-4, Part 10, Advanced Video Coding (AVC), ITU-T H.265/High Efficiency Video Coding (HEVC), and extensions of such standards. The video devices may transmit, receive, encode, decode, and/or store digital video information more efficiently by implementing such video coding techniques.

Video coding techniques include spatial (intra-picture) prediction and/or temporal (inter-picture) prediction to reduce or remove redundancy inherent in video sequences. For block-based video coding, a video slice (e.g., a video picture or a portion of a video picture) may be partitioned into video blocks, which may also be referred to as coding tree units (CTUs), coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to as reference frames.

SUMMARY

This disclosure describes techniques for maintain a decoded picture buffer for decoding multi-layer video data. As part of maintaining the DPB, a video decoder may need to periodically remove pictures from the DPB in order to make room for new pictures to be added to the DPB. When decoding multi-layer video data, some existing video decoders maintain sub-DPBs, where each sub-DPB contains picture storage buffers for storage of decoded pictures of one layer. In contrast, when decoding multi-layer video data, some existing video decoders maintain a common DPB for all layers, which reduces complexity but potentially introduces other problems. For example, if a bumping process is only invoked for pictures belonging to same layer as the picture being coded, then in some coding scenarios where the buffer does not include any pictures of that layer, then the bumping process may not properly create room in the DPB for new pictures. The techniques of this disclosure, which include performing a picture output and removal process on a DPB by removing from the DPB only decoded pictures that belong to a first layer and, after removing a last decoding unit of the current picture from a CPB, performing a picture bumping process across all layers of the DPB may advantageously enable a video decoder to utilize a common DPB for all layers while ensuring that needed reference pictures are not prematurely removed from the DPB and also while ensuring that the DPB does not become overly full.

According to an example of this disclosure, device for decoding video data includes a memory configured to store video data and one or more processors implemented in circuitry and configured to maintain a decoded picture buffer (DPB) for storing reference pictures for a plurality of layers, wherein the plurality of layers comprise at least a first layer and a second layer; prior to decoding a current picture of an access unit of the first layer, perform a picture output and removal process on the DPB, wherein to perform the picture output and removal process on the DPB, the one or more processors are further configured to remove from the DPB only decoded pictures that belong to the first layer; and after removing a last decoding unit of the current picture from a coded picture buffer (CPB), perform a picture bumping process across all layers of the DPB.

According to another example of this disclosure, a method includes maintaining a decoded picture buffer (DPB) for storing reference pictures for a plurality of layers, wherein the plurality of layers comprise at least a first layer and a second layer; prior to decoding a current picture of an access unit of the first layer, performing a picture output and removal process on the DPB, wherein performing the picture output and removal process on the DPB comprises removing from the DPB only decoded pictures that belong to the first layer; and after removing a last decoding unit of the current picture from a coded picture buffer (CPB), performing a picture bumping process across all layers of the DPB.

According to another example of this disclosure, a computer-readable storage medium stores instructions that when executed by one or more processors cause the one or more processors to maintain a decoded picture buffer (DPB) for storing reference pictures for a plurality of layers, wherein the plurality of layers comprise at least a first layer and a second layer; prior to decoding a current picture of an access unit of the first layer, perform a picture output and removal process on the DPB, wherein to perform the picture output and removal process on the DPB, the one or more processors are further configured to remove from the DPB only decoded pictures that belong to the first layer; and after removing a last decoding unit of the current picture from a coded picture buffer (CPB), perform a picture bumping process across all layers of the DPB.

According to another example of this disclosure, an apparatus for decoding multi-layer video data includes means for maintaining a decoded picture buffer (DPB) for storing reference pictures for a plurality of layers, wherein the plurality of layers comprise at least a first layer and a second layer; means for performing a picture output and removal process on the DPB prior to decoding a current picture of an access unit of the first layer, wherein performing the picture output and removal process on the DPB comprises removing from the DPB only decoded pictures that belong to the first layer; and means for performing a picture bumping process across all layers of the DPB after removing a last decoding unit of the current picture from a coded picture buffer (CPB).

The details of one or more examples are set forth in the accompanying drawings and the description below. Other features, objects, and advantages will be apparent from the description, drawings, and claims.

DETAILED DESCRIPTION

Figure 1:
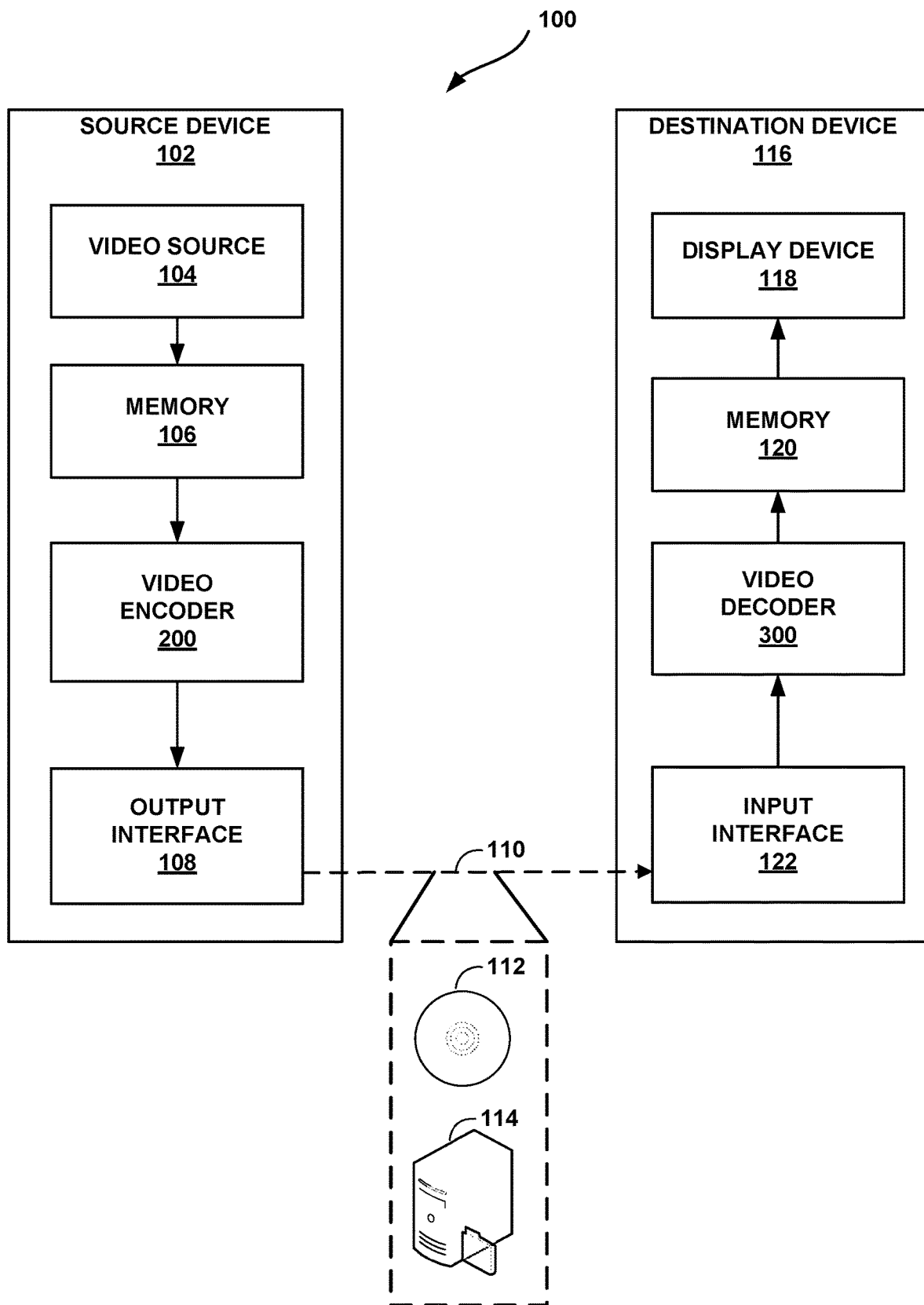
FIG. 1 is a block diagram illustrating an example video encoding and decoding system that may perform the techniques of this disclosure.

Video coding (e.g., video encoding and/or video decoding) typically involves predicting a block of video data from either an already coded block of video data in the same picture (e.g., intra prediction) or an already coded block of video data in a different picture (e.g., inter prediction). In some instances, the video encoder also calculates residual data by comparing the prediction block to the original block. Thus, the residual data represents a difference between the prediction block and the original block. To reduce the number of bits needed to signal the residual data, the video encoder transforms and quantizes the residual data and signals the transformed and quantized residual data in the encoded bitstream. The compression achieved by the transform and quantization processes may be lossy, meaning that transform and quantization processes may introduce distortion into the decoded video data.

A video decoder decodes and adds the residual data to the prediction block to produce a reconstructed video block that matches the original video block more closely than the prediction block alone. Due to the loss introduced by the transforming and quantizing of the residual data, the first reconstructed block may have distortion or artifacts. One common type of artifact or distortion is referred to as blockiness, where the boundaries of the blocks used to code the video data are visible.

To further improve the quality of decoded video, a video decoder can perform one or more filtering operations on the reconstructed video blocks. Examples of these filtering operations include deblocking filtering, sample adaptive offset (SAO) filtering, and adaptive loop filtering (ALF). Parameters for these filtering operations may either be determined by a video encoder and explicitly signaled in the encoded video bitstream or may be implicitly determined by a video decoder without needing the parameters to be explicitly signaled in the encoded video bitstream.

A video encoder encodes and a video decoder decodes video data as network abstraction layer (NAL) units. A NAL unit generally refers to a syntax structure containing an indication of the type of data to follow and bytes containing that data in the form of a raw byte sequence payload (RBSP) interspersed as necessary with emulation prevention bytes. NAL units may include both video coding layer (VCL) NAL units and non-VCL NAL units.

A picture unit (PU) generally refers to a set of NAL units that are associated with each other according to a specified classification rule, are consecutive in decoding order, and contain exactly one coded picture. An access units generally refers to a set of PUs that belong to different layers and contain coded pictures associated with the same time for output.

In order to support spatial and temporal scalability, video data can be coded in multiple layers. A layer generally refers to the set of VCL NAL units that all have the same layer identification value (e.g., nuh_layer_id value) and the associated non-VCL NAL units. When decoding multi-layer video data, a video decoder may decode and display all the layers or only a subset of the layers.

A video decoder may maintain, e.g., store and update, a coded picture buffer (CPB). A CPB may, for example, be a first-in first-out buffer containing decoding units (DUs) in a specified decoding order. A video decoder may also maintain a decoded picture buffer (DPB). A DPB generally refers to a buffer or memory that holds decoded pictures for reference, output reordering, or a specified output delay. A DU may refer to one or more VCL NAL units in an access unit (AU) and the associated non-VCL NAL units. In some instances, a DU may also be an AU.

As part of maintaining the DPB, a video decoder may need to periodically remove pictures from the DPB in order to make room for new pictures to be added to the DPB. When decoding multi-layer video data, some existing video decoders maintain sub-DPBs, where each sub-DPB contains picture storage buffers for storage of decoded pictures of one layer. In contrast, when decoding multi-layer video data, some existing video decoders maintain a common DPB for all layers, which reduces complexity but potentially introduces other problems. For example, if a bumping process is only invoked for pictures belonging to same layer as the picture being coded, then in some coding scenarios where the buffer does not include any pictures of that layer, then the bumping process may not properly create room in the DPB for new pictures. The techniques of this disclosure, which include performing a picture output and removal process on a DPB by removing from the DPB only decoded pictures that belong to a first layer and, after removing a last decoding unit of the current picture from a CPB, performing a picture bumping process across all layers of the DPB may advantageously enable a video decoder to utilize a common DPB for all layers while ensuring that needed reference pictures are not prematurely removed from the DPB and also while ensuring that the DPB does not become overly full.

Certain techniques described in this disclosure may be described with respect to video decoding. It should be understood, however, that unless specified to the contrary, these techniques may also be performed by a video encoder. For example, a video encoder typically performs video decoding (also called reconstruction) as part of the processes of determining how to encode video data. For example, as part of determining how to encode blocks of video data, a video encoder may be configured to implement the same DPB updating processes as a video decoder, such that the video encoder and video decoder maintain the same DPBs.

FIG. 1 is a block diagram illustrating an example video encoding and decoding system 100 that may perform the techniques of this disclosure. The techniques of this disclosure are generally directed to coding (encoding and/or decoding) video data. In general, video data includes any data for processing a video. Thus, video data may include raw, unencoded video, encoded video, decoded (e.g., reconstructed) video, and video metadata, such as signaling data.

As shown in FIG. 1, system 100 includes a source device 102 that provides encoded video data to be decoded and displayed by a destination device 116, in this example. In particular, source device 102 provides the video data to destination device 116 via a computer-readable medium 110. Source device 102 and destination device 116 may comprise any of a wide range of devices, including desktop computers, notebook (i.e., laptop) computers, mobile devices, tablet computers, set-top boxes, telephone handsets such as smartphones, televisions, cameras, display devices, digital media players, video gaming consoles, video streaming device, broadcast receiver devices, or the like. In some cases, source device 102 and destination device 116 may be equipped for wireless communication, and thus may be referred to as wireless communication devices.

In the example of FIG. 1, source device 102 includes video source 104, memory 106, video encoder 200, and output interface 108. Destination device 116 includes input interface 122, video decoder 300, memory 120, and display device 118. In accordance with this disclosure, video encoder 200 of source device 102 and video decoder 300 of destination device 116 may be configured to apply the techniques for a shared decoded picture buffer for multiple layers. Thus, source device 102 represents an example of a video encoding device, while destination device 116 represents an example of a video decoding device. In other examples, a source device and a destination device may include other components or arrangements. For example, source device 102 may receive video data from an external video source, such as an external camera. Likewise, destination device 116 may interface with an external display device, rather than include an integrated display device.

System 100 as shown in FIG. 1 is merely one example. In general, any digital video encoding and/or decoding device may perform techniques for a shared decoded picture buffer for multiple layers. Source device 102 and destination device 116 are merely examples of such coding devices in which source device 102 generates coded video data for transmission to destination device 116. This disclosure refers to a "coding" device as a device that performs coding (encoding and/or decoding) of data. Thus, video encoder 200 and video decoder 300 represent examples of coding devices, in particular, a video encoder and a video decoder, respectively. In some examples, source device 102 and destination device 116 may operate in a substantially symmetrical manner such that each of source device 102 and destination device 116 includes video encoding and decoding components. Hence, system 100 may support one-way or two-way video transmission between source device 102 and destination device 116, e.g., for video streaming, video playback, video broadcasting, or video telephony.

In general, video source 104 represents a source of video data (i.e., raw, unencoded video data) and provides a sequential series of pictures (also referred to as "frames") of the video data to video encoder 200, which encodes data for the pictures. Video source 104 of source device 102 may include a video capture device, such as a video camera, a video archive containing previously captured raw video, and/or a video feed interface to receive video from a video content provider. As a further alternative, video source 104 may generate computer graphics-based data as the source video, or a combination of live video, archived video, and computer-generated video. In each case, video encoder 200 encodes the captured, pre-captured, or computer-generated video data. Video encoder 200 may rearrange the pictures from the received order (sometimes referred to as "display order") into a coding order for coding. Video encoder 200 may generate a bitstream including encoded video data. Source device 102 may then output the encoded video data via output interface 108 onto computer-readable medium 110 for reception and/or retrieval by, e.g., input interface 122 of destination device 116.

Memory 106 of source device 102 and memory 120 of destination device 116 represent general purpose memories. In some examples, memories 106, 120 may store raw video data, e.g., raw video from video source 104 and raw, decoded video data from video decoder 300. Additionally or alternatively, memories 106, 120 may store software instructions executable by, e.g., video encoder 200 and video decoder 300, respectively. Although memory 106 and memory 120 are shown separately from video encoder 200 and video decoder 300 in this example, it should be understood that video encoder 200 and video decoder 300 may also include internal memories for functionally similar or equivalent purposes. Furthermore, memories 106, 120 may store encoded video data, e.g., output from video encoder 200 and input to video decoder 300. In some examples, portions of memories 106, 120 may be allocated as one or more video buffers, e.g., to store raw, decoded, and/or encoded video data.

Computer-readable medium 110 may represent any type of medium or device capable of transporting the encoded video data from source device 102 to destination device 116. In one example, computer-readable medium 110 represents a communication medium to enable source device 102 to transmit encoded video data directly to destination device 116 in real-time, e.g., via a radio frequency network or computer-based network. Output interface 108 may modulate a transmission signal including the encoded video data, and input interface 122 may demodulate the received transmission signal, according to a communication standard, such as a wireless communication protocol. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 102 to destination device 116.

In some examples, source device 102 may output encoded data from output interface 108 to storage device 112. Similarly, destination device 116 may access encoded data from storage device 112 via input interface 122. Storage device 112 may include any of a variety of distributed or locally accessed data storage media such as a hard drive, Blu-ray discs, DVDs, CD-ROMs, flash memory, volatile or non-volatile memory, or any other suitable digital storage media for storing encoded video data.

In some examples, source device 102 may output encoded video data to file server 114 or another intermediate storage device that may store the encoded video data generated by source device 102. Destination device 116 may access stored video data from file server 114 via streaming or download.

File server 114 may be any type of server device capable of storing encoded video data and transmitting that encoded video data to the destination device 116. File server 114 may represent a web server (e.g., for a web site), a server configured to provide a file transfer protocol service (such as File Transfer Protocol (FTP) or File Delivery over Unidirectional Transport (FLUTE) protocol), a content delivery network (CDN) device, a hypertext transfer protocol (HTTP) server, a Multimedia Broadcast Multicast Service (MBMS) or Enhanced MBMS (eMBMS) server, and/or a network attached storage (NAS) device. File server 114 may, additionally or alternatively, implement one or more HTTP streaming protocols, such as Dynamic Adaptive Streaming over HTTP (DASH), HTTP Live Streaming (HLS), Real Time Streaming Protocol (RTSP), HTTP Dynamic Streaming, or the like.

Destination device 116 may access encoded video data from file server 114 through any standard data connection, including an Internet connection. This may include a wireless channel (e.g., a Wi-Fi connection), a wired connection (e.g., digital subscriber line (DSL), cable modem, etc.), or a combination of both that is suitable for accessing encoded video data stored on file server 114. Input interface 122 may be configured to operate according to any one or more of the various protocols discussed above for retrieving or receiving media data from file server 114, or other such protocols for retrieving media data.

Output interface 108 and input interface 122 may represent wireless transmitters/receivers, modems, wired networking components (e.g., Ethernet cards), wireless communication components that operate according to any of a variety of IEEE 802.11 standards, or other physical components. In examples where output interface 108 and input interface 122 comprise wireless components, output interface 108 and input interface 122 may be configured to transfer data, such as encoded video data, according to a cellular communication standard, such as 4G, 4G-LTE (Long-Term Evolution), LTE Advanced, 5G, or the like. In some examples where output interface 108 comprises a wireless transmitter, output interface 108 and input interface 122 may be configured to transfer data, such as encoded video data, according to other wireless standards, such as an IEEE 802.11 specification, an IEEE 802.15 specification (e.g., ZigBee™), a Bluetooth™ standard, or the like. In some examples, source device 102 and/or destination device 116 may include respective system-on-a-chip (SoC) devices. For example, source device 102 may include an SoC device to perform the functionality attributed to video encoder 200 and/or output interface 108, and destination device 116 may include an SoC device to perform the functionality attributed to video decoder 300 and/or input interface 122.

The techniques of this disclosure may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications.

Input interface 122 of destination device 116 receives an encoded video bitstream from computer-readable medium 110 (e.g., a communication medium, storage device 112, file server 114, or the like). The encoded video bitstream may include signaling information defined by video encoder 200, which is also used by video decoder 300, such as syntax elements having values that describe characteristics and/or processing of video blocks or other coded units (e.g., slices, pictures, groups of pictures, sequences, or the like). Display device 118 displays decoded pictures of the decoded video data to a user. Display device 118 may represent any of a variety of display devices such as a liquid crystal display (LCD), a plasma display, an organic light emitting diode (OLED) display, or another type of display device.

Although not shown in FIG. 1, in some examples, video encoder 200 and video decoder 300 may each be integrated with an audio encoder and/or audio decoder, and may include appropriate MUX-DEMUX units, or other hardware and/or software, to handle multiplexed streams including both audio and video in a common data stream. If applicable, MUX-DEMUX units may conform to the ITU H.223 multiplexer protocol, or other protocols such as the user datagram protocol (UDP).

Video encoder 200 and video decoder 300 each may be implemented as any of a variety of suitable encoder and/or decoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of video encoder 200 and video decoder 300 may be included in one or more encoders or decoders, either of which may be integrated as part of a combined encoder/decoder (CODEC) in a respective device. A device including video encoder 200 and/or video decoder 300 may comprise an integrated circuit, a microprocessor, and/or a wireless communication device, such as a cellular telephone.

Video encoder 200 and video decoder 300 may operate according to a video coding standard, such as ITU-T H.265, also referred to as High Efficiency Video Coding (HEVC) or extensions thereto, such as the multi-view and/or scalable video coding extensions. Alternatively, video encoder 200 and video decoder 300 may operate according to other proprietary or industry standards, such as the Joint Exploration Test Model (JEM) or ITU-T H.266, also referred to as Versatile Video Coding (VVC). A recent draft of the VVC standard is described in Bross, et al. "Versatile Video Coding (Draft 7)," Joint Video Experts Team (WET) of ITU-T SG 16 WP 3 and ISO/IEC JTC 1/SC 29/WG 11, 16$^{th}$ Meeting: Geneva, CH, 1-11 October 2019, JVET-P2001-v14 (hereinafter "VVC Draft 7"). The techniques of this disclosure, however, are not limited to any particular coding standard.

In general, video encoder 200 and video decoder 300 may perform block-based coding of pictures. The term "block" generally refers to a structure including data to be processed (e.g., encoded, decoded, or otherwise used in the encoding and/or decoding process). For example, a block may include a two-dimensional matrix of samples of luminance and/or chrominance data. In general, video encoder 200 and video decoder 300 may code video data represented in a YUV (e.g., Y, Cb, Cr) format. That is, rather than coding red, green, and blue (RGB) data for samples of a picture, video encoder 200 and video decoder 300 may code luminance and chrominance components, where the chrominance components may include both red hue and blue hue chrominance components. In some examples, video encoder 200 converts received RGB formatted data to a YUV representation prior to encoding, and video decoder 300 converts the YUV representation to the RGB format. Alternatively, pre- and post-processing units (not shown) may perform these conversions.

This disclosure may generally refer to coding (e.g., encoding and decoding) of pictures to include the process of encoding or decoding data of the picture. Similarly, this disclosure may refer to coding of blocks of a picture to include the process of encoding or decoding data for the blocks, e.g., prediction and/or residual coding. An encoded video bitstream generally includes a series of values for syntax elements representative of coding decisions (e.g., coding modes) and partitioning of pictures into blocks. Thus, references to coding a picture or a block should generally be understood as coding values for syntax elements forming the picture or block.

HEVC defines various blocks, including coding units (CUs), prediction units (PUs), and transform units (TUs). According to HEVC, a video coder (such as video encoder 200) partitions a coding tree unit (CTU) into CUs according to a quadtree structure. That is, the video coder partitions CTUs and CUs into four equal, non-overlapping squares, and each node of the quadtree has either zero or four child nodes. Nodes without child nodes may be referred to as "leaf nodes," and CUs of such leaf nodes may include one or more PUs and/or one or more TUs. The video coder may further partition PUs and TUs. For example, in HEVC, a residual quadtree (RQT) represents partitioning of TUs. In HEVC, PUs represent inter-prediction data, while TUs represent residual data. CUs that are intra-predicted include intra-prediction information, such as an intra-mode indication.

As another example, video encoder 200 and video decoder 300 may be configured to operate according to VVC. According to VVC, a video coder (such as video encoder 200) partitions a picture into a plurality of coding tree units (CTUs). Video encoder 200 may partition a CTU according to a tree structure, such as a quadtree-binary tree (QTBT) structure or Multi-Type Tree (MTT) structure. The QTBT structure removes the concepts of multiple partition types, such as the separation between CUs, PUs, and TUs of HEVC. A QTBT structure includes two levels: a first level partitioned according to quadtree partitioning, and a second level partitioned according to binary tree partitioning. A root node of the QTBT structure corresponds to a CTU. Leaf nodes of the binary trees correspond to coding units (CUs).

In an MTT partitioning structure, blocks may be partitioned using a quadtree (QT) partition, a binary tree (BT) partition, and one or more types of triple tree (TT) (also called ternary tree (TT)) partitions. A triple or ternary tree partition is a partition where a block is split into three sub-blocks. In some examples, a triple or ternary tree partition divides a block into three sub-blocks without dividing the original block through the center. The partitioning types in MTT (e.g., QT, BT, and TT), may be symmetrical or asymmetrical.

In some examples, video encoder 200 and video decoder 300 may use a single QTBT or MTT structure to represent each of the luminance and chrominance components, while in other examples, video encoder 200 and video decoder 300 may use two or more QTBT or MTT structures, such as one QTBT/MTT structure for the luminance component and another QTBT/MTT structure for both chrominance components (or two QTBT/MTT structures for respective chrominance components).

Video encoder 200 and video decoder 300 may be configured to use quadtree partitioning per HEVC, QTBT partitioning, MTT partitioning, or other partitioning structures. For purposes of explanation, the description of the techniques of this disclosure is presented with respect to QTBT partitioning. However, it should be understood that the techniques of this disclosure may also be applied to video coders configured to use quadtree partitioning, or other types of partitioning as well.

In some examples, a CTU includes a coding tree block (CTB) of luma samples, two corresponding CTBs of chroma samples of a picture that has three sample arrays, or a CTB of samples of a monochrome picture or a picture that is coded using three separate color planes and syntax structures used to code the samples. A CTB may be an N×N block of samples for some value of N such that the division of a component into CTBs is a partitioning. A component is an array or single sample from one of the three arrays (luma and two chroma) that compose a picture in 4:2:0, 4:2:2, or 4:4:4 color format or the array or a single sample of the array that compose a picture in monochrome format. In some examples, a coding block is an M×N block of samples for some values of M and N such that a division of a CTB into coding blocks is a partitioning.

The blocks (e.g., CTUs or CUs) may be grouped in various ways in a picture. As one example, a brick may refer to a rectangular region of CTU rows within a particular tile in a picture. A tile may be a rectangular region of CTUs within a particular tile column and a particular tile row in a picture. A tile column refers to a rectangular region of CTUs having a height equal to the height of the picture and a width specified by syntax elements (e.g., such as in a picture parameter set). A tile row refers to a rectangular region of CTUs having a height specified by syntax elements (e.g., such as in a picture parameter set) and a width equal to the width of the picture.

In some examples, a tile may be partitioned into multiple bricks, each of which may include one or more CTU rows within the tile. A tile that is not partitioned into multiple bricks may also be referred to as a brick. However, a brick that is a true subset of a tile may not be referred to as a tile.

The bricks in a picture may also be arranged in a slice. A slice may be an integer number of bricks of a picture that may be exclusively contained in a single network abstraction layer (NAL) unit. In some examples, a slice includes either a number of complete tiles or only a consecutive sequence of complete bricks of one tile.

This disclosure may use "N×N" and "N by N" interchangeably to refer to the sample dimensions of a block (such as a CU or other video block) in terms of vertical and horizontal dimensions, e.g., 16×16 samples or 16 by 16 samples. In general, a 16×16 CU will have 16 samples in a vertical direction (y=16) and 16 samples in a horizontal direction (x=16). Likewise, an N×N CU generally has N samples in a vertical direction and N samples in a horizontal direction, where N represents a nonnegative integer value. The samples in a CU may be arranged in rows and columns. Moreover, CUs need not necessarily have the same number of samples in the horizontal direction as in the vertical direction. For example, CUs may comprise N×M samples, where M is not necessarily equal to N.

Video encoder 200 encodes video data for CUs representing prediction and/or residual information, and other information. The prediction information indicates how the CU is to be predicted in order to form a prediction block for the CU. The residual information generally represents sample-by-sample differences between samples of the CU prior to encoding and the prediction block.

To predict a CU, video encoder 200 may generally form a prediction block for the CU through inter-prediction or intra-prediction. Inter-prediction generally refers to predicting the CU from data of a previously coded picture, whereas intra-prediction generally refers to predicting the CU from previously coded data of the same picture. To perform inter-prediction, video encoder 200 may generate the prediction block using one or more motion vectors. Video encoder 200 may generally perform a motion search to identify a reference block that closely matches the CU, e.g., in terms of differences between the CU and the reference block. Video encoder 200 may calculate a difference metric using a sum of absolute difference (SAD), sum of squared differences (SSD), mean absolute difference (MAD), mean squared differences (MSD), or other such difference calculations to determine whether a reference block closely matches the current CU. In some examples, video encoder 200 may predict the current CU using uni-directional prediction or bi-directional prediction.

Some examples of VVC also provide an affine motion compensation mode, which may be considered an inter-prediction mode. In affine motion compensation mode, video encoder 200 may determine two or more motion vectors that represent non-translational motion, such as zoom in or out, rotation, perspective motion, or other irregular motion types.

To perform intra-prediction, video encoder 200 may select an intra-prediction mode to generate the prediction block. Some examples of VVC provide sixty-seven intra-prediction modes, including various directional modes, as well as planar mode and DC mode. In general, video encoder 200 selects an intra-prediction mode that describes neighboring samples to a current block (e.g., a block of a CU) from which to predict samples of the current block. Such samples may generally be above, above and to the left, or to the left of the current block in the same picture as the current block, assuming video encoder 200 codes CTUs and CUs in raster scan order (left to right, top to bottom).

Video encoder 200 encodes data representing the prediction mode for a current block. For example, for inter-prediction modes, video encoder 200 may encode data representing which of the various available inter-prediction modes is used, as well as motion information for the corresponding mode. For uni-directional or bi-directional inter-prediction, for example, video encoder 200 may encode motion vectors using advanced motion vector prediction (AMVP) or merge mode. Video encoder 200 may use similar modes to encode motion vectors for affine motion compensation mode.

Following prediction, such as intra-prediction or inter-prediction of a block, video encoder 200 may calculate residual data for the block. The residual data, such as a residual block, represents sample by sample differences between the block and a prediction block for the block, formed using the corresponding prediction mode. Video encoder 200 may apply one or more transforms to the residual block, to produce transformed data in a transform domain instead of the sample domain. For example, video encoder 200 may apply a discrete cosine transform (DCT), an integer transform, a wavelet transform, or a conceptually similar transform to residual video data. Additionally, video encoder 200 may apply a secondary transform following the first transform, such as a mode-dependent non-separable secondary transform (MDNSST), a signal dependent transform, a Karhunen-Loeve transform (KLT), or the like. Video encoder 200 produces transform coefficients following application of the one or more transforms.

As noted above, following any transforms to produce transform coefficients, video encoder 200 may perform quantization of the transform coefficients. Quantization generally refers to a process in which transform coefficients are quantized to possibly reduce the amount of data used to represent the transform coefficients, providing further compression. By performing the quantization process, video encoder 200 may reduce the bit depth associated with some or all of the transform coefficients. For example, video encoder 200 may round an n-bit value down to an m-bit value during quantization, where n is greater than m. In some examples, to perform quantization, video encoder 200 may perform a bitwise right-shift of the value to be quantized.

Following quantization, video encoder 200 may scan the transform coefficients, producing a one-dimensional vector from the two-dimensional matrix including the quantized transform coefficients. The scan may be designed to place higher energy (and therefore lower frequency) transform coefficients at the front of the vector and to place lower energy (and therefore higher frequency) transform coefficients at the back of the vector. In some examples, video encoder 200 may utilize a predefined scan order to scan the quantized transform coefficients to produce a serialized vector, and then entropy encode the quantized transform coefficients of the vector. In other examples, video encoder 200 may perform an adaptive scan. After scanning the quantized transform coefficients to form the one-dimensional vector, video encoder 200 may entropy encode the one-dimensional vector, e.g., according to context-adaptive binary arithmetic coding (CABAC). Video encoder 200 may also entropy encode values for syntax elements describing metadata associated with the encoded video data for use by video decoder 300 in decoding the video data.

To perform CABAC, video encoder 200 may assign a context within a context model to a symbol to be transmitted. The context may relate to, for example, whether neighboring values of the symbol are zero-valued or not. The probability determination may be based on a context assigned to the symbol.

Video encoder 200 may further generate syntax data, such as block-based syntax data, picture-based syntax data, and sequence-based syntax data, to video decoder 300, e.g., in a picture header, a block header, a slice header, or other syntax data, such as a sequence parameter set (SPS), picture parameter set (PPS), or video parameter set (VPS). Video decoder 300 may likewise decode such syntax data to determine how to decode corresponding video data.

In this manner, video encoder 200 may generate a bitstream including encoded video data, e.g., syntax elements describing partitioning of a picture into blocks (e.g., CUs) and prediction and/or residual information for the blocks. Ultimately, video decoder 300 may receive the bitstream and decode the encoded video data.

In general, video decoder 300 performs a reciprocal process to that performed by video encoder 200 to decode the encoded video data of the bitstream. For example, video decoder 300 may decode values for syntax elements of the bitstream using CABAC in a manner substantially similar to, albeit reciprocal to, the CABAC encoding process of video encoder 200. The syntax elements may define partitioning information for partitioning of a picture into CTUs, and partitioning of each CTU according to a corresponding partition structure, such as a QTBT structure, to define CUs of the CTU. The syntax elements may further define prediction and residual information for blocks (e.g., CUs) of video data.

The residual information may be represented by, for example, quantized transform coefficients. Video decoder 300 may inverse quantize and inverse transform the quantized transform coefficients of a block to reproduce a residual block for the block. Video decoder 300 uses a signaled prediction mode (intra- or inter-prediction) and related prediction information (e.g., motion information for inter-prediction) to form a prediction block for the block. Video decoder 300 may then combine the prediction block and the residual block (on a sample-by-sample basis) to reproduce the original block. Video decoder 300 may perform additional processing, such as performing a deblocking process to reduce visual artifacts along boundaries of the block.

This disclosure may generally refer to "signaling" certain information, such as syntax elements. The term "signaling" may generally refer to the communication of values for syntax elements and/or other data used to decode encoded video data. That is, video encoder 200 may signal values for syntax elements in the bitstream. In general, signaling refers to generating a value in the bitstream. As noted above, source device 102 may transport the bitstream to destination device 116 substantially in real time, or not in real time, such as might occur when storing syntax elements to storage device 112 for later retrieval by destination device 116.

Figure 2A:
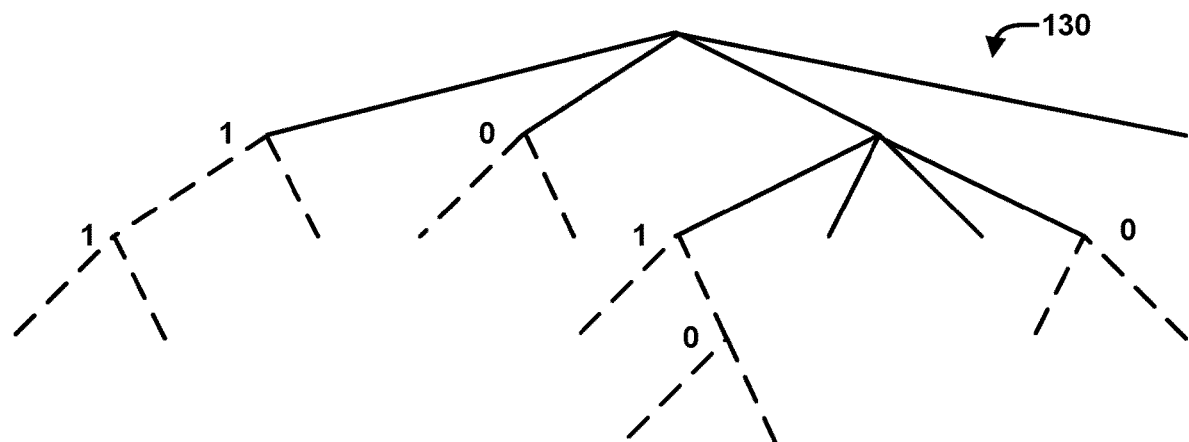
FIGS. 2A and 2B are conceptual diagrams illustrating an example quadtree binary tree (QTBT) structure, and a corresponding coding tree unit (CTU).
Figure 2B:
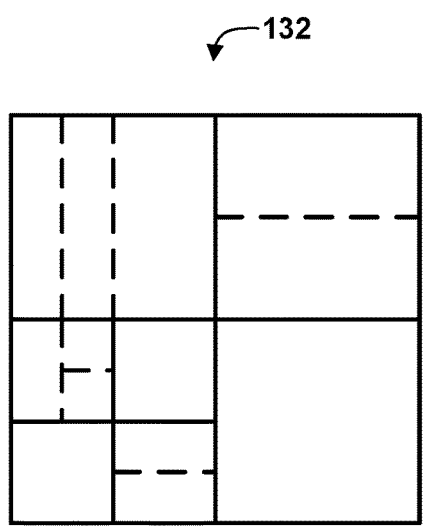

FIGS. 2A and 2B are conceptual diagrams illustrating an example quadtree binary tree (QTBT) structure 130, and a corresponding coding tree unit (CTU) 132. The solid lines represent quadtree splitting, and dotted lines indicate binary tree splitting. In each split (i.e., non-leaf) node of the binary tree, one flag is signaled to indicate which splitting type (i.e., horizontal or vertical) is used, where 0 indicates horizontal splitting and 1 indicates vertical splitting in this example. For the quadtree splitting, there is no need to indicate the splitting type, because quadtree nodes split a block horizontally and vertically into 4 sub-blocks with equal size. Accordingly, video encoder 200 may encode, and video decoder 300 may decode, syntax elements (such as splitting information) for a region tree level of QTBT structure 130 (i.e., the solid lines) and syntax elements (such as splitting information) for a prediction tree level of QTBT structure 130 (i.e., the dashed lines). Video encoder 200 may encode, and video decoder 300 may decode, video data, such as prediction and transform data, for CUs represented by terminal leaf nodes of QTBT structure 130.

In general, CTU 132 of FIG. 2B may be associated with parameters defining sizes of blocks corresponding to nodes of QTBT structure 130 at the first and second levels. These parameters may include a CTU size (representing a size of CTU 132 in samples), a minimum quadtree size (MinQTSize, representing a minimum allowed quadtree leaf node size), a maximum binary tree size (MaxBTSize, representing a maximum allowed binary tree root node size), a maximum binary tree depth (MaxBTDepth, representing a maximum allowed binary tree depth), and a minimum binary tree size (MinBTSize, representing the minimum allowed binary tree leaf node size).

The root node of a QTBT structure corresponding to a CTU may have four child nodes at the first level of the QTBT structure, each of which may be partitioned according to quadtree partitioning. That is, nodes of the first level are either leaf nodes (having no child nodes) or have four child nodes. The example of QTBT structure 130 represents such nodes as including the parent node and child nodes having solid lines for branches. If nodes of the first level are not larger than the maximum allowed binary tree root node size (MaxBTSize), then the nodes can be further partitioned by respective binary trees. The binary tree splitting of one node can be iterated until the nodes resulting from the split reach the minimum allowed binary tree leaf node size (MinBTSize) or the maximum allowed binary tree depth (MaxBTDepth). The example of QTBT structure 130 represents such nodes as having dashed lines for branches. The binary tree leaf node is referred to as a coding unit (CU), which is used for prediction (e.g., intra-picture or inter-picture prediction) and transform, without any further partitioning. As discussed above, CUs may also be referred to as "video blocks" or "blocks."

In one example of the QTBT partitioning structure, the CTU size is set as 128×128 (luma samples and two corresponding 64×64 chroma samples), the MinQTSize is set as 16×16, the MaxBTSize is set as 64×64, the MinBTSize (for both width and height) is set as 4, and the MaxBTDepth is set as 4. The quadtree partitioning is applied to the CTU first to generate quad-tree leaf nodes. The quadtree leaf nodes may have a size from 16×16 (i.e., the MinQTSize) to 128×128 (i.e., the CTU size). If the quadtree leaf node is 128×128, the leaf quadtree node will not be further split by the binary tree, because the size exceeds the MaxBTSize (i.e., 64×64, in this example). Otherwise, the quadtree leaf node will be further partitioned by the binary tree. Therefore, the quadtree leaf node is also the root node for the binary tree and has the binary tree depth as 0. When the binary tree depth reaches MaxBTDepth (4, in this example), no further splitting is permitted. A binary tree node having a width equal to MinBTSize (4, in this example) implies that no further vertical splitting (that is, dividing of the width) is permitted for that binary tree node. Similarly, a binary tree node having a height equal to MinBTSize implies no further horizontal splitting (that is, dividing of the height) is permitted for that binary tree node. As noted above, leaf nodes of the binary tree are referred to as CUs, and are further processed according to prediction and transform without further partitioning.

VVC Draft 7 supports multi-layer coding where the DPB is common, or shared, across different layers. The DPB operation is expressed in terms of sub-DPBs, where a sub-DPB is defined in section C.3.1 of VVC Draft 7 as follows.

The DPB conceptually consists of sub-DPBs and each sub-DPB contains picture storage buffers for storage of decoded pictures of one layer. Each of the picture storage buffers contains a decoded picture that is marked as "used for reference" or is held for future output There is a picture output process that is called for each layer independently. Section C.5.2.1 of VVC Draft 7 describes this process as follows:

The process for output and removal of pictures from the DPB before decoding of the current picture as specified in clause C.5.2.2 is invoked, followed by the invocation of the process for current decoded picture marking and storage as specified in clause C.3.4, and finally followed by the invocation of the process for additional bumping as specified in clause C.5.2.3. The "bumping" process is specified in clause C.5.2.4 and is invoked as specified in clauses C.5.2.2 and C.5.2.3.

These processes are applied independently for each layer, starting from the lowest layer in the OLS, in increasing order of the nuh_layer_id values of the layers in the OLS. When these processes are applied for a particular layer, only the sub-DPB for the particular layer is affected.

DPB parameters are signaled in a dpb_parameters( ) syntax structure, which is reproduced below

| | Descriptor |
|---|---|
| dpb_parameters( dpbSizeOnlyFlag, maxSubLayersMinus1, subLayerInfoFlag ) {   for( i = ( subLayerInfoFlag ? 0 : maxSubLayersMinus1 );      i <= maxSubLayersMinus1; i++ ) {     max_dec_pic_buffering_minus1[ i ]     if( !dpbSizeOnlyFlag ) { | ue(v) |

| | Descriptor |
|---|---|
| max_num_reorder_pics[ i ] | ue(v) |
| max_latency_increase_plus1[ i ] | ue(v) |
| } | |
| } | |
| } | |

VVC Draft 7 defines the syntax element "max_dec_pic_buffering_minus1[i]" as follows—max_dec_pic_buffering_minus1[i] plus 1 specifies, for each for each CLVS of the CVS, the maximum required size of the DPB in units of picture storage buffers when Htid is equal to i. The value of max_dec_pic_buffering_minus1[i] shall be in the range of 0 to MaxDpbSize−1, inclusive, where MaxDpb Size is as specified in clause A.4.2. When i is greater than 0, max_dec_pic_buffering_minus1[i] shall be greater than or equal to max_dec_pic_buffering_minus1[i−1]. When max_dec_pic_buffering_minus1[i] is not present for i in the range of 0 to maxSubLayersMinus1−1, inclusive, due to subLayerInfoFlag being equal to 0, it is inferred to be equal to max_dec_pic_buffering_minus1[maxSubLayersMinus1].

VVC Draft 7 defines the syntax element "max_num_reorder_pics[i]" as follows—max_num_reorder_pics[i] specifies, for each CLVS of the CVS, the maximum allowed number of pictures of the CLVS that can precede any picture in the CLVS in decoding order and follow that picture in output order when Htid is equal to i. The value of max_num_reorder_pics[i] shall be in the range of 0 to max_dec_pic_buffering_minus1[i], inclusive. When i is greater than 0, max_num_reorder_pics[i] shall be greater than or equal to max_num_reorder_pics[i−1]. When max_num_reorder_pics[i] is not present for i in the range of 0 to maxSubLayersMinus1−1, inclusive, due to subLayerInfoFlag being equal to 0, it is inferred to be equal to max_num_reorder_pics[maxSubLayersMinus1].

VVC Draft 7 defines the syntax element "max_latency_increase_plus1[i]" as follows—max_latency_increase_plus1[i] not equal to 0 is used to compute the value of MaxLatencyPictures[i], which specifies, for each CLVS of the CVS, the maximum number of pictures in the CLVS that can precede any picture in the CLVS in output order and follow that picture in decoding order when Htid is equal to i.

When max_latency_increase_plus1[i] is not equal to 0, the value of MaxLatencyPictures[i] is specified as follows:

$$MaxLatencyPictures[i]=max\_num\_reorder\_pics[i]+max\_latency\_increase\_plus1[i]-1 \qquad (7-73)$$

When max_latency_increase_plus1[i] is equal to 0, no corresponding limit is expressed.

The value of max_latency_increase_plus1[i] shall be in the range of 0 to $2^{32}-2$, inclusive. When max_latency_increase_plus1[i] is not present for i in the range of 0 to maxSubLayersMinus1−1, inclusive, due to subLayerInfoFlag being equal to 0, it is inferred to be equal to max_latency_increase_plus1[maxSubLayersMinus1].

The DPB implementation of VVC Draft 7 may have several problems. As one example, in VVC Draft 7, a DPB operation is expressed using sub-DPBs and sub-DPB fullness. VVC Draft 7, however, does not define sub-DPB fullness and does not specify how sub-DPB fullness is related to DPB fullness which is specified in dpb_parameters( ) picture structure.

Additionally, an operation on a sub-DPB is unspecified, such as how sub-DPB fullness should be checked. Comparing a particular sub-DPB to the maximum DPB size (MaxDpb Size) may not be enough as there can be multiple sub-DPBs, and those sub-DPBs may exceed the specified DPB resource.

In section C.5.2.1 of VVC Draft 7, output and removal of pictures from the DPB is invoked for each layer where only a sub-DPB for the particular layer is affected. However, DPB size is not defined for a sub-DPB, so it is unclear how, for example, the condition "The number of pictures in the DPB is greater than or equal to max_dec_pic_buffering_minus1[Htid]+1" should be checked for a sub-DPB.

This disclosure described techniques that may address the aforementioned problems. The solutions provided in this disclosure can be used independently or in any combination.

Portions of the description provided herein are described with respect to the example of using DPB size, which is specified by max_dec_pic_buffering_minus1 syntax element. However, the techniques of this disclosure may also be used in conjunction with other parameter signaled in dpb_paramters( ) syntax structure, such as max_num_reorder_pics and max_latency_increase_plus1. All these parameters are signaled for the entire DPB and not for a sub-DPB, so the sub-DPB condition checks currently utilized in VVC Draft 7 may be performed on the entire DPB using the signaled dpb_paramters( ) syntax elements.

The disclosed techniques described for a DPB may be applicable in other operations where a sub-DPB is used. For example, for coded picture buffer (CPB) or hypothetical reference decoder (HRD) processing.

As part of utilizing shared decoder picture buffer for multiple layers, video encoder 200 and video decoder 300 may be configured to perform the following techniques.

When sub-DPBs are used, the entire DPB fullness is not initialized in VVC Draft 7. In some examples of this disclosure, video encoder 200 and video decoder 300 may configured to initialize DPB fullness to 0, when the first picture of video sequence is parsed. In one example, video encoder 200 and video decoder 300 may be configured to initialize DPB fullness to 0 when the first slice of the CLVSS picture 0 with the lowest nuh_layer_id is parsed.

A DPB picture marking process is applied to the current layer pictures. However, the state of other nuh_layer_id pictures in the DPB is not specified in VVC Draft 7. In some examples of this disclosure, the picture state, or status, refers to a picture marking, such as "used for short-term reference," "used for long-term reference," "used for inter-layer prediction," etc., and may alternatively or additionally include a picture output status, such as picture "used for output," picture is "not needed for output" and etc.

For some examples, it may be desirable to keep the state of the other layer pictures unchanged, i.e. the state is kept in DPB after the previous access unit decoding. In other words, the state of the previous picture of that other nuh_layer_id is kept. In this case, if other layer picture is a reference picture, it may not be removed by the "bumping" process.

In some examples, all pictures can be marked as used for reference (for example, used for short-term reference, use for long term reference) when the first picture of the current access unit is decoded.

In some examples, in the "bumping" process (C.5.2.4), the picture is removed (emptied) only if the picture has layer id equal to the current picture layer id. In this case, the picture of other layers may be output but not removed from DPB even when they are not referenced, the removal of such pictures will happen when the pictures of that layer is decoded.

In one example, DPB fullness may be defined as a sum of sub-DPB fullness, since the MaxDpbSize is defined for each layer in output layer set (OLS) and not for a sub-DPB. For example, MaxDpb Size may be specified by a profile/level/tier as the maximum number of picture storage buffers. Additionally, if sub-DPB size is defined or signaled then the sum of sub-DPB sizes shall not exceed MaxDpb Size. In one example, such a constraint may be expressed as follows:

It is a requirement of bitstream conformance that the sum of max_dec_pic_buffering_minus1[i] for all layers included in an AU is in the range of 0 to MaxDpbSize−1, inclusive.

In some examples, the constraint may be expressed as follows:

It is a requirement of bitstream conformance that the sum of max_dec_pic_buffering_minus1[i] for all layers included in an OLS is in the range of 0 to MaxDpbSize−1, inclusive.

In the output and removal picture processes, instead of performing all operations for each layer independently, video encoder 200 and video decoder 300 may be configured to perform some operations per layer and some operations for an entire DPB across layers even if the process is invoked per layer. For example, video encoder 200 and video decoder 300 may be configured to maintain a DPB for storing reference pictures for a plurality of layers that includes at least a first layer and a second layer. Prior to decoding a current picture of an access unit of the first layer, video encoder 200 and video decoder 300 may be configured to perform a picture output and removal process on the DPB, such as that described below with respect to section C.5.2.2. After removing a last decoding unit of the current picture from a CPB, video encoder 200 and video decoder 300 may be configured to perform a picture bumping process across all layers of the DPB as described below with respect to sections C.5.2.3 and C.5.2.4.

In one example, the picture output and removal and additional bumping processes are invoked per layer, where for coded layer video sequence start (CLVSS) pictures (intra random access point (IRAP) pictures) the sub-DPB is emptied while the "bumping" process C.5.2.4 is operating on the entire DPB across layers, since it can be a case when AU is incomplete (not all layers pictures are present) but pictures of other layers may be needed to be output before the pictures of the layers present in the current AU.

When a sub-DpB is emptied per layer, i.e. pictures with a certain layer ID are emptied, the picture "bumping" process is called for the entire DPB including pictures of all layers.

In a similar way, the processes of DPB operation (e.g., section C.3) are invoked for a layer or per layer, but when pictures are output or emptied such processes are invoked for all pictures in a DPB, e.g., across layers.

In one example, this technique may be implemented by removing the condition of "When these processes are applied for a particular layer, only the sub-DPB for the particular layer is affected" from the related sections from VVC Draft 7.

In some examples, picture removal may be applied only within each layer whereas picture output may be across different layers.

As part of performing the above-described techniques, video encoder 200 and/or video decoder 300 may be configured to maintain a decoded picture buffer (DPB) for storing reference pictures for a plurality of layers, wherein the DPB comprises a sub-DPB for storing reference pictures for a layer of the plurality of layers; decode a picture of the video data; and store a copy of the decoded picture as a reference picture in the DPB.

Video encoder 200 and/or video decoder 300 may also be configured to determine a fullness of the sub-DPB and/or determining a fullness of the DPB. Video encoder 200 and/or video decoder 300 may also be configured to initialize a fullness of the sub-DPB to zero in response to a first picture of a video sequence being parsed and/or initialize a fullness of the sub-DPB to zero in response to a first slice of a CLVSS picture 0 with a lowest nuh_layer_id being parsed. Video encoder 200 and/or video decoder 300 may also be configured mark pictures stored in the sub-DPB with a state.

In one example using VVC Draft 7, the techniques of this disclosure may be implemented with the following modifications to the picture output and removal description. The tag "<ADD>" shows the beginning of additions proposed by this disclosure, and the tag "</ADD>" shows the end of those additions. The tag "<DEL>" shows the beginning of deletions (i.e., text removal) proposed by this disclosure, and the tag "</DEL>" shows the end of those deletions.

In the following description, an AU represents a set PUs that belong to different layers and contain coded pictures associated with the same time for output from the DPB. A decoding unit (DU) refers to an AU if DecodingUnitHrdFlag is equal to 0 or a subset of an AU otherwise, consisting of one or more VCL NAL units in an AU and the associated non-VCL NAL units.

8.3.3 Decoding Process for Reference Picture Marking

This process is invoked once per picture, after decoding of a slice header and the decoding process for reference picture list construction for the slice as specified in clause 8.3.2, but prior to the decoding of the slice data. This process may result in one or more reference pictures in the DPB being marked as "unused for reference" or "used for long-term reference".

A decoded picture in the DPB can be marked as "unused for reference," "used for short-term reference" or "used for long-term reference," but only one among these three at any given moment during the operation of the decoding process. Assigning one of these markings to a picture implicitly removes another of these markings when applicable. When a picture is referred to as being marked as "used for reference," this collectively refers to the picture being marked as "used for short-term reference" or "used for long-term reference" (but not both).

STRPs and ILRPs are identified by their nuh_layer_id and PicOrderCntVal values. LTRPs are identified by their nuh_layer_id values and the Log 2(MaxLtPicOrderCntLsb) LSBs of their PicOrderCntVal values.

If the current picture is a CLVSS picture, all reference pictures currently in the DPB (if any) with the same nuh_layer_id as the current picture are marked as "unused for reference".

Otherwise, the following applies:

For each LTRP entry in RefPicList[0] or RefPicList[1], when the picture is an STRP with the same nuh_layer_id as the current picture, the picture is marked as "used for long-term reference".

Each reference picture with the same nuh_layer_id as the current picture in the DPB that is not referred to by any entry in RefPicList[0] or RefPicList[1] is marked as "unused for reference".

For each ILRP entry in RefPicList[0] or RefPicList[1], the picture is marked as "used for long-term reference".

<ADD> Pictures in DPB with the different from the current picture nuh_layer_id retain their DPB status from the previous picture marking. </ADD>

In some examples, it may be specified that reference picture marking of the current picture does not affect the reference pictures marking of pictures that have nuh_layer_id not equal to that of the current picture.

C.5.2 Operation of the Output Order DPB

C.5.2.1 General

The specifications in this clause apply independently to each set of DPB parameters selected as specified in clause C.1.

The DPB conceptually consists of sub-DPBs and each sub-DPB contains picture storage buffers for storage of decoded pictures of one layer. Each of the picture storage buffers contains a decoded picture that is marked as "used for reference" or is held for future output.

The process for output and removal of pictures from the DPB before decoding of the current picture as specified in clause C.5.2.2 is invoked, followed by the invocation of the process for current decoded picture marking and storage as specified in clause C.3.4, and finally followed by the invocation of the process for additional bumping as specified in clause C.5.2.3. The "bumping" process is specified in clause C.5.2.4 and is invoked as specified in clauses C.5.2.2 and C.5.2.3.

<DEL> These processes </DEL><ADD> The clause C.5.2.2 "Output and removal of pictures from the DPB" and C.5.2.3 "Additional bumping" </ADD> are applied independently for each layer, starting from the lowest layer in the OLS, in increasing order of the nuh_layer_id values of the layers in the OLS. <DEL> When these processes are applied for a particular layer, only the sub-DPB for the particular layer is affected. </DEL><ADD> The clause C.5.2.4 is applied for all pictures of any layer in the DPB. </ADD>

NOTE—In the operation of output order DPB, same as in the operation of output timing DPB, decoded pictures with PicOutputFlag equal to 1 in the same access unit are also output consecutively in ascending order of the nuh_layer_id values of the decoded pictures.

Let picture n and the current picture be the coded picture or decoded picture of the access unit n for a particular value of nuh_layer_id, wherein n is a non-negative integer number.

C.5.2.2 Output and Removal of Pictures from the DPB

The output and removal of pictures from the DPB before the decoding of the current picture (but after parsing the slice header of the first slice of the current picture) happens instantaneously when the first DU of the AU containing the current picture is removed from the CPB and proceeds as follows:

The decoding process for reference picture list construction as specified in clause 8.3.2 and decoding process for reference picture marking as specified in clause 8.3.3 are invoked.

If the current picture is a CLVSS picture that is not picture 0, the following ordered steps are applied:

1. The variable NoOutputOfPriorPicsFlag is derived for the decoder under test as follows:
   If the value of pic_width_max_in_luma_samples, pic_height_max_in_luma_samples, chroma_format_idc, separate_colour_plane_flag, bit_depth_minus8, or max_dec_pic_buffering_minus1[Htid] derived for any picture of the current AU is different from the value of pic_width_max_in_luma_samples, pic_height_max_in_luma_samples, chroma_format_idc, separate_colour_plane_flag, bit_depth_minus8, or max_dec_pic_buffering_minus1[Htid], respectively, for the preceding picture in the same CLVS, NoOutputOfPriorPicsFlag may (but should not) be set to 1 by the decoder under test, regardless of the value of no_output_of_prior_pics_flag.
   NOTE—Although setting NoOutputOfPriorPicsFlag equal to no_output_of_prior_pics_flag is preferred under these conditions, the decoder under test is allowed to set NoOutputOfPriorPicsFlag to 1 in this case.
   Otherwise, NoOutputOfPriorPicsFlag is set equal to no_output_of_prior_pics_flag.
2. The value of NoOutputOfPriorPicsFlag derived for the decoder under test is applied for the HRD as follows:
   If NoOutputOfPriorPicsFlag is equal to 1, all picture storage buffers in the <DEL>DPB</DEL><ADD>sub-DPB</ADD> are emptied without output of the pictures they contain and the DPB fullness is <DEL> set equal to 0</DEL><ADD> decremented by one for each picture storage buffer that is emptied</ADD>.
   [In the alternative language using sub-DPB fullness, If NoOutputOfPriorPicsFlag is equal to 1, all picture storage buffers in the <DEL>DPB</DEL><ADD>sub-DPB</ADD> are emptied without output of the pictures they contain and the <DEL>DPB</DEL><ADD>sub-DPB</ADD> fullness is set equal to 0.]
   Otherwise (NoOutputOfPriorPicsFlag is equal to 0), all picture storage buffers containing a picture that is marked as "not needed for output" and "unused for reference" are emptied (without output) and all non-empty picture storage buffers in the <DEL>DPB</DEL><ADD>sub-DPB</ADD> are emptied by repeatedly invoking the "bumping" process specified in clause C.5.2.4 and the DPB fullness is <DEL>set equal to 0</DEL><ADD> decremented by one for each picture storage buffer that is emptied</ADD>.
   [In the alternative language using sub-DPB fullness, Otherwise (NoOutputOfPriorPicsFlag is equal to 0), all picture storage buffers containing a picture that is marked as "not needed for output" and "unused for reference" are emptied (without output) and all non-empty picture storage buffers in the <DEL>DPB</DEL><ADD>sub-DPB</ADD> are emptied by repeatedly invoking the "bumping" process specified in clause C.5.2.4 and the <DEL>DPB</DEL><ADD>sub-DPB</ADD> fullness is set equal to 0.]
   [In another alternative language, Otherwise (NoOutputOfPriorPicsFlag is equal to 0), all picture storage buffers containing a picture that is marked as "not needed for output" and "unused for reference" are emptied (without output) and all non-empty picture storage buffers in <ADD> all</ADD> the <DEL>DPB</DEL><ADD>sub-DPB</ADD> are emptied by repeatedly invoking the "bumping" process specified in clause C.5.2.4 and the <DEL>DPB</DEL><ADD>sub-DPB</ADD> fullness <ADD> of all the sub-DPBs</ADD> is set equal to 0.]

Otherwise (the current picture is not a CLVSS picture <ADD> or the CLVSS picture is picture 0</ADD>), all picture storage buffers containing a picture which are marked as "not needed for output" and "unused for reference" are emptied (without output). For each picture storage buffer that is emptied, the DPB fullness is decremented by one. When one or more of the following conditions are true, the "bumping" process specified in clause C.5.2.4 is invoked repeatedly while further decrementing the DPB fullness by one for each additional picture storage buffer that is emptied, until none of the following conditions are true:

The number of pictures in the DPB that are marked as "needed for output" is greater than max_num_reorder_pics[Htid].

max_latency_increase_plus1[Htid] is not equal to 0 and there is at least one picture in the DPB that is marked as "needed for output" for which the associated variable PicLatencyCount is greater than or equal to MaxLatencyPictures[Htid].

The number of pictures in the DPB is greater than or equal to max_dec_pic_buffering_minus1[Htid]+1.

C.5.2.3 Additional Bumping

The processes specified in this clause happen instantaneously when the last DU of AU n containing the current picture is removed from the CPB.

When the current picture has PictureOutputFlag equal to 1, for each picture in the DPB that is marked as "needed for output" and follows the current picture in output order, the associated variable PicLatencyCount is set equal to PicLatencyCount+1.

The following applies:

If the current decoded picture has PictureOutputFlag equal to 1, it is marked as "needed for output" and its associated variable PicLatencyCount is set equal to 0.

Otherwise (the current decoded picture has PictureOutputFlag equal to 0), it is marked as "not needed for output".

When one or more of the following conditions are true, the "bumping" process specified in clause C.5.2.4 is invoked repeatedly until none of the following conditions are true:

The number of pictures in the DPB that are marked as "needed for output" is greater than max_num_reorder_pics[Htid].

max_latency_increase_plus1[Htid] is not equal to 0 and there is at least one picture in the DPB that is marked as "needed for output" for which the associated variable PicLatencyCount that is greater than or equal to MaxLatencyPictures[Htid].

C.5.2.4 "Bumping" Process

The "bumping" process consists of the following ordered steps:

1. The picture or pictures that are first for output are selected as the one having the smallest value of PicOrderCntVal of all pictures in the DPB marked as "needed for output".

2. Each of these pictures, in ascending nuh_layer_id order, is cropped, using the conformance cropping window for the picture, the cropped picture is output, and the picture is marked as "not needed for output."

3. Each picture storage buffer that contains a picture marked as "unused for reference" and that was one of the pictures cropped and output is emptied and the fullness of the <DEL> associated sub-</DEL>DPB is decremented by one.

NOTE—For any two pictures picA and picB that belong to the same CVS and are output by the "bumping process," when picA is output earlier than picB, the value of PicOrderCntVal of picA is less than <ADD> or equal to</ADD> the value of PicOrderCntVal of picB.

Figure 3:
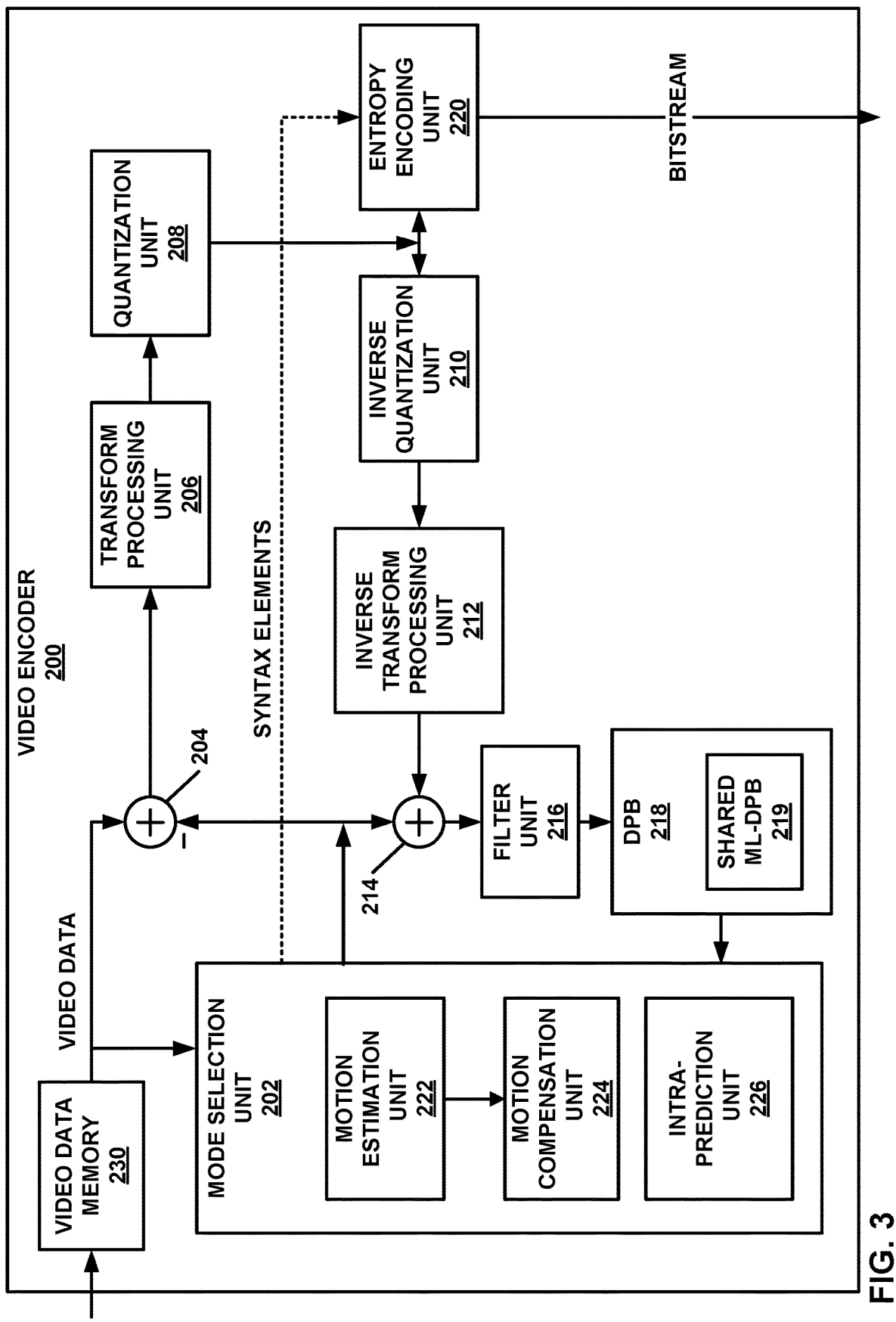
FIG. 3 is a block diagram illustrating an example video encoder that may perform the techniques of this disclosure.

FIG. 3 is a block diagram illustrating an example video encoder 200 that may perform the techniques of this disclosure. FIG. 3 is provided for purposes of explanation and should not be considered limiting of the techniques as broadly exemplified and described in this disclosure. For purposes of explanation, this disclosure describes video encoder 200 in the context of video coding standards such as the HEVC video coding standard and the H.266 video coding standard in development. However, the techniques of this disclosure are not limited to these video coding standards, and are applicable generally to video encoding and decoding.

In the example of FIG. 3, video encoder 200 includes video data memory 230, mode selection unit 202, residual generation unit 204, transform processing unit 206, quantization unit 208, inverse quantization unit 210, inverse transform processing unit 212, reconstruction unit 214, filter unit 216, DPB 218, and entropy encoding unit 220. Any or all of video data memory 230, mode selection unit 202, residual generation unit 204, transform processing unit 206, quantization unit 208, inverse quantization unit 210, inverse transform processing unit 212, reconstruction unit 214, filter unit 216, DPB 218, and entropy encoding unit 220 may be implemented in one or more processors or in processing circuitry. For instance, the units of video encoder 200 may be implemented as one or more circuits or logic elements as part of hardware circuitry, or as part of a processor, ASIC, of FPGA. Moreover, video encoder 200 may include additional or alternative processors or processing circuitry to perform these and other functions.

Video data memory 230 may store video data to be encoded by the components of video encoder 200. Video encoder 200 may receive the video data stored in video data memory 230 from, for example, video source 104 (FIG. 1). DPB 218 may act as a reference picture memory that stores reference video data for use in prediction of subsequent video data by video encoder 200. Video data memory 230 and DPB 218 may be formed by any of a variety of memory devices, such as dynamic random access memory (DRAM), including synchronous DRAM (SDRAM), magnetoresistive RAM (MRAM), resistive RAM (RRAM), or other types of memory devices. Video data memory 230 and DPB 218 may be provided by the same memory device or separate memory devices. In various examples, video data memory 230 may be on-chip with other components of video encoder 200, as illustrated, or off-chip relative to those components.

DPB 218 may include a shared multi-layer DPB 219. As explained in more detail elsewhere in this this disclosure, video encoder 200 may be configured to store reference pictures for a plurality of layers in shared multi-layer DPB 219. Prior to decoding a current picture of an access unit of a first layer, video encoder 200 may perform a picture output and removal process on shared multi-layer DPB 219 to remove from shared multi-layer DPB 219 only some decoded pictures that belong to the first layer. After removing a last decoding unit of the current picture from a CPB, video encoder 200 may perform a picture bumping process across all layers of shared multi-layer DPB 219.

In this disclosure, reference to video data memory 230 should not be interpreted as being limited to memory internal to video encoder 200, unless specifically described as such, or memory external to video encoder 200, unless specifically described as such. Rather, reference to video data memory 230 should be understood as reference memory that stores video data that video encoder 200 receives for encoding (e.g., video data for a current block that is to be encoded). Memory 106 of FIG. 1 may also provide temporary storage of outputs from the various units of video encoder 200.

The various units of FIG. 3 are illustrated to assist with understanding the operations performed by video encoder 200. The units may be implemented as fixed-function circuits, programmable circuits, or a combination thereof. Fixed-function circuits refer to circuits that provide particular functionality, and are preset on the operations that can be performed. Programmable circuits refer to circuits that can be programmed to perform various tasks, and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, one or more of the units may be distinct circuit blocks (fixed-function or programmable), and in some examples, one or more of the units may be integrated circuits.

Video encoder 200 may include arithmetic logic units (ALUs), elementary function units (EFUs), digital circuits, analog circuits, and/or programmable cores, formed from programmable circuits. In examples where the operations of video encoder 200 are performed using software executed by the programmable circuits, memory 106 (FIG. 1) may store the instructions (e.g., object code) of the software that video encoder 200 receives and executes, or another memory within video encoder 200 (not shown) may store such instructions.

Video data memory 230 is configured to store received video data. Video encoder 200 may retrieve a picture of the video data from video data memory 230 and provide the video data to residual generation unit 204 and mode selection unit 202. Video data in video data memory 230 may be raw video data that is to be encoded.

Mode selection unit 202 includes a motion estimation unit 222, motion compensation unit 224, and an intra-prediction unit 226. Mode selection unit 202 may include additional functional units to perform video prediction in accordance with other prediction modes. As examples, mode selection unit 202 may include a palette unit, an intra-block copy unit (which may be part of motion estimation unit 222 and/or motion compensation unit 224), an affine unit, a linear model (LM) unit, or the like.

Mode selection unit 202 generally coordinates multiple encoding passes to test combinations of encoding parameters and resulting rate-distortion values for such combinations. The encoding parameters may include partitioning of CTUs into CUs, prediction modes for the CUs, transform types for residual data of the CUs, quantization parameters for residual data of the CUs, and so on. Mode selection unit 202 may ultimately select the combination of encoding parameters having rate-distortion values that are better than the other tested combinations.

Video encoder 200 may partition a picture retrieved from video data memory 230 into a series of CTUs, and encapsulate one or more CTUs within a slice. Mode selection unit 202 may partition a CTU of the picture in accordance with a tree structure, such as the QTBT structure or the quad-tree structure of HEVC described above. As described above, video encoder 200 may form one or more CUs from partitioning a CTU according to the tree structure. Such a CU may also be referred to generally as a "video block" or "block."

In general, mode selection unit 202 also controls the components thereof (e.g., motion estimation unit 222, motion compensation unit 224, and intra-prediction unit 226) to generate a prediction block for a current block (e.g., a current CU, or in HEVC, the overlapping portion of a PU and a TU). For inter-prediction of a current block, motion estimation unit 222 may perform a motion search to identify one or more closely matching reference blocks in one or more reference pictures (e.g., one or more previously coded pictures stored in DPB 218). In particular, motion estimation unit 222 may calculate a value representative of how similar a potential reference block is to the current block, e.g., according to sum of absolute difference (SAD), sum of squared differences (SSD), mean absolute difference (MAD), mean squared differences (MSD), or the like. Motion estimation unit 222 may generally perform these calculations using sample-by-sample differences between the current block and the reference block being considered. Motion estimation unit 222 may identify a reference block having a lowest value resulting from these calculations, indicating a reference block that most closely matches the current block.

Motion estimation unit 222 may form one or more motion vectors (MVs) that defines the positions of the reference blocks in the reference pictures relative to the position of the current block in a current picture. Motion estimation unit 222 may then provide the motion vectors to motion compensation unit 224. For example, for uni-directional inter-prediction, motion estimation unit 222 may provide a single motion vector, whereas for bi-directional inter-prediction, motion estimation unit 222 may provide two motion vectors. Motion compensation unit 224 may then generate a prediction block using the motion vectors. For example, motion compensation unit 224 may retrieve data of the reference block using the motion vector. As another example, if the motion vector has fractional sample precision, motion compensation unit 224 may interpolate values for the prediction block according to one or more interpolation filters. Moreover, for bi-directional inter-prediction, motion compensation unit 224 may retrieve data for two reference blocks identified by respective motion vectors and combine the retrieved data, e.g., through sample-by-sample averaging or weighted averaging.

As another example, for intra-prediction, or intra-prediction coding, intra-prediction unit 226 may generate the prediction block from samples neighboring the current block. For example, for directional modes, intra-prediction unit 226 may generally mathematically combine values of neighboring samples and populate these calculated values in the defined direction across the current block to produce the prediction block. As another example, for DC mode, intra-prediction unit 226 may calculate an average of the neighboring samples to the current block and generate the prediction block to include this resulting average for each sample of the prediction block.

Mode selection unit 202 provides the prediction block to residual generation unit 204. Residual generation unit 204 receives a raw, unencoded version of the current block from video data memory 230 and the prediction block from mode selection unit 202. Residual generation unit 204 calculates sample-by-sample differences between the current block and the prediction block. The resulting sample-by-sample differences define a residual block for the current block. In some examples, residual generation unit 204 may also determine differences between sample values in the residual block to generate a residual block using residual differential pulse code modulation (RDPCM). In some examples, residual generation unit 204 may be formed using one or more subtractor circuits that perform binary subtraction.

In examples where mode selection unit 202 partitions CUs into PUs, each PU may be associated with a luma prediction unit and corresponding chroma prediction units. Video encoder 200 and video decoder 300 may support PUs having various sizes. As indicated above, the size of a CU may refer to the size of the luma coding block of the CU and the size of a PU may refer to the size of a luma prediction unit of the PU. Assuming that the size of a particular CU is 2N×2N, video encoder 200 may support PU sizes of 2N×2N or N×N for intra prediction, and symmetric PU sizes of 2N×2N, 2N×N, N×2N, N×N, or similar for inter prediction. Video encoder 200 and video decoder 300 may also support asymmetric partitioning for PU sizes of 2N×nU, 2N×nD, nL×2N, and nR×2N for inter prediction.

In examples where mode selection unit 202 does not further partition a CU into PUs, each CU may be associated with a luma coding block and corresponding chroma coding blocks. As above, the size of a CU may refer to the size of the luma coding block of the CU. The video encoder 200 and video decoder 300 may support CU sizes of 2N×2N, 2N×N, or N×2N.

For other video coding techniques such as an intra-block copy mode coding, an affine-mode coding, and linear model (LM) mode coding, as few examples, mode selection unit 202, via respective units associated with the coding techniques, generates a prediction block for the current block being encoded. In some examples, such as palette mode coding, mode selection unit 202 may not generate a prediction block, and instead generate syntax elements that indicate the manner in which to reconstruct the block based on a selected palette. In such modes, mode selection unit 202 may provide these syntax elements to entropy encoding unit 220 to be encoded.

As described above, residual generation unit 204 receives the video data for the current block and the corresponding prediction block. Residual generation unit 204 then generates a residual block for the current block. To generate the residual block, residual generation unit 204 calculates sample-by-sample differences between the prediction block and the current block.

Transform processing unit 206 applies one or more transforms to the residual block to generate a block of transform coefficients (referred to herein as a "transform coefficient block"). Transform processing unit 206 may apply various transforms to a residual block to form the transform coefficient block. For example, transform processing unit 206 may apply a discrete cosine transform (DCT), a directional transform, a Karhunen-Loeve transform (KLT), or a conceptually similar transform to a residual block. In some examples, transform processing unit 206 may perform multiple transforms to a residual block, e.g., a primary transform and a secondary transform, such as a rotational transform. In some examples, transform processing unit 206 does not apply transforms to a residual block.

Quantization unit 208 may quantize the transform coefficients in a transform coefficient block, to produce a quantized transform coefficient block. Quantization unit 208 may quantize transform coefficients of a transform coefficient block according to a quantization parameter (QP) value associated with the current block. Video encoder 200 (e.g., via mode selection unit 202) may adjust the degree of quantization applied to the transform coefficient blocks associated with the current block by adjusting the QP value associated with the CU. Quantization may introduce loss of information, and thus, quantized transform coefficients may have lower precision than the original transform coefficients produced by transform processing unit 206.

Inverse quantization unit 210 and inverse transform processing unit 212 may apply inverse quantization and inverse transforms to a quantized transform coefficient block, respectively, to reconstruct a residual block from the transform coefficient block. Reconstruction unit 214 may produce a reconstructed block corresponding to the current block (albeit potentially with some degree of distortion) based on the reconstructed residual block and a prediction block generated by mode selection unit 202. For example, reconstruction unit 214 may add samples of the reconstructed residual block to corresponding samples from the prediction block generated by mode selection unit 202 to produce the reconstructed block.

Filter unit 216 may perform one or more filter operations on reconstructed blocks. For example, filter unit 216 may perform deblocking operations to reduce blockiness artifacts along edges of CUs. Operations of filter unit 216 may be skipped, in some examples.

Video encoder 200 stores reconstructed blocks in DPB 218. For instance, in examples where operations of filter unit 216 are not performed, reconstruction unit 214 may store reconstructed blocks to DPB 218. In examples where operations of filter unit 216 are performed, filter unit 216 may store the filtered reconstructed blocks to DPB 218. Motion estimation unit 222 and motion compensation unit 224 may retrieve a reference picture from DPB 218, formed from the reconstructed (and potentially filtered) blocks, to inter-predict blocks of subsequently encoded pictures. In addition, intra-prediction unit 226 may use reconstructed blocks in DPB 218 of a current picture to intra-predict other blocks in the current picture.

In general, entropy encoding unit 220 may entropy encode syntax elements received from other functional components of video encoder 200. For example, entropy encoding unit 220 may entropy encode quantized transform coefficient blocks from quantization unit 208. As another example, entropy encoding unit 220 may entropy encode prediction syntax elements (e.g., motion information for inter-prediction or intra-mode information for intra-prediction) from mode selection unit 202. Entropy encoding unit 220 may perform one or more entropy encoding operations on the syntax elements, which are another example of video data, to generate entropy-encoded data. For example, entropy encoding unit 220 may perform a context-adaptive variable length coding (CAVLC) operation, a CABAC operation, a variable-to-variable (V2V) length coding operation, a syntax-based context-adaptive binary arithmetic coding (SBAC) operation, a Probability Interval Partitioning Entropy (PIPE) coding operation, an Exponential-Golomb encoding operation, or another type of entropy encoding operation on the data. In some examples, entropy encoding unit 220 may operate in bypass mode where syntax elements are not entropy encoded.

Video encoder 200 may output a bitstream that includes the entropy encoded syntax elements needed to reconstruct blocks of a slice or picture. In particular, entropy encoding unit 220 may output the bitstream.

The operations described above are described with respect to a block. Such description should be understood as being operations for a luma coding block and/or chroma coding blocks. As described above, in some examples, the luma coding block and chroma coding blocks are luma and chroma components of a CU. In some examples, the luma coding block and the chroma coding blocks are luma and chroma components of a PU.

In some examples, operations performed with respect to a luma coding block need not be repeated for the chroma coding blocks. As one example, operations to identify a motion vector (MV) and reference picture for a luma coding block need not be repeated for identifying a MV and reference picture for the chroma blocks. Rather, the MV for the luma coding block may be scaled to determine the MV for the chroma blocks, and the reference picture may be the same. As another example, the intra-prediction process may be the same for the luma coding block and the chroma coding blocks.

Video encoder 200 represents an example of a device configured to encode video data including a memory configured to store video data, and one or more processing units implemented in circuitry and configured to perform the techniques of this disclosure, including the techniques described in the claims section below.

Figure 4:
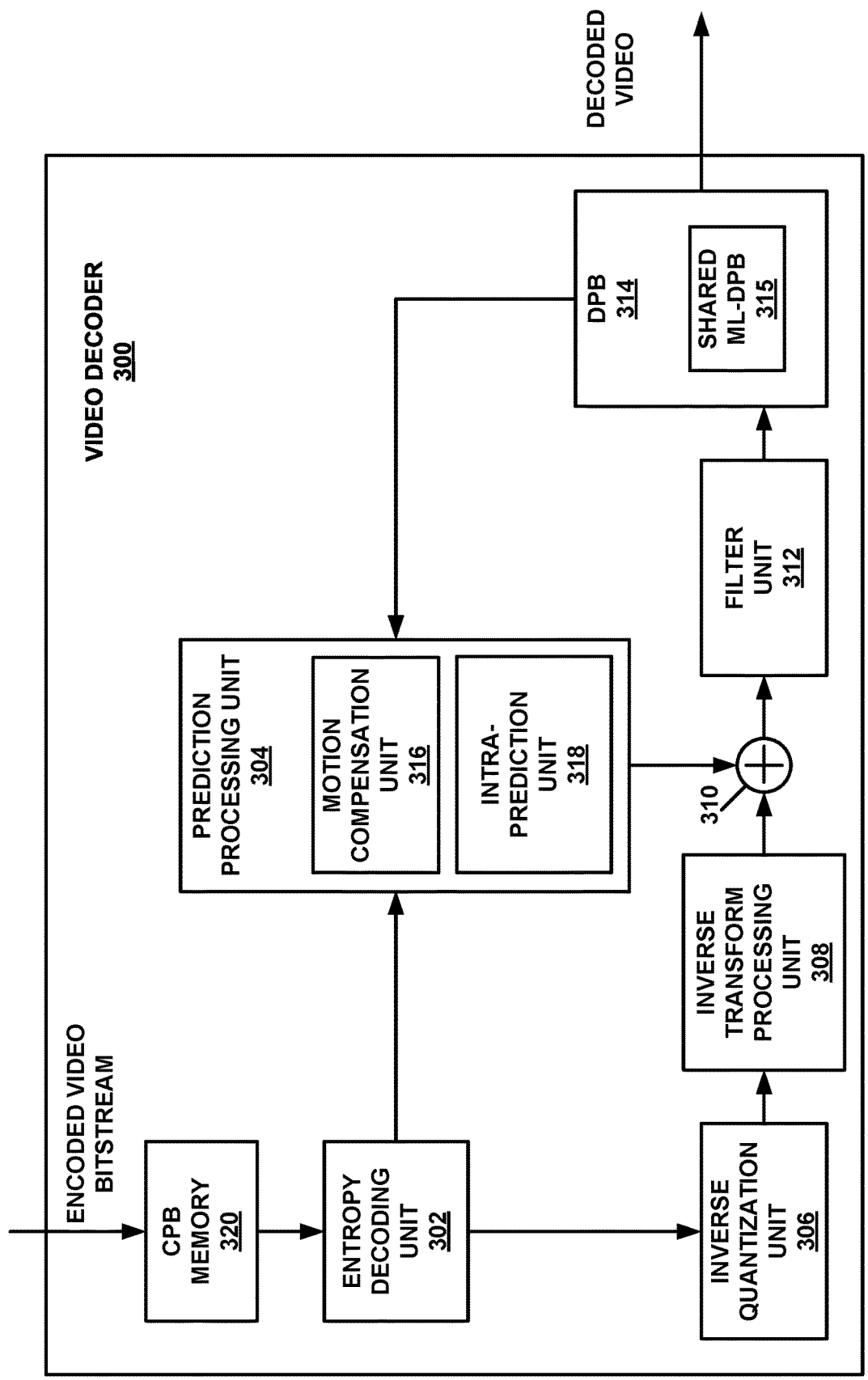
FIG. 4 is a block diagram illustrating an example video decoder that may perform the techniques of this disclosure.

FIG. 4 is a block diagram illustrating an example video decoder 300 that may perform the techniques of this disclosure. FIG. 4 is provided for purposes of explanation and is not limiting on the techniques as broadly exemplified and described in this disclosure. For purposes of explanation, this disclosure describes video decoder 300 according to the techniques of JEM, VVC, and HEVC. However, the techniques of this disclosure may be performed by video coding devices that are configured to other video coding standards.

In the example of FIG. 4, video decoder 300 includes CPB memory 320, entropy decoding unit 302, prediction processing unit 304, inverse quantization unit 306, inverse transform processing unit 308, reconstruction unit 310, filter unit 312, and DPB 314. Any or all of CPB memory 320, entropy decoding unit 302, prediction processing unit 304, inverse quantization unit 306, inverse transform processing unit 308, reconstruction unit 310, filter unit 312, and DPB 314 may be implemented in one or more processors or in processing circuitry. For instance, the units of video decoder 300 may be implemented as one or more circuits or logic elements as part of hardware circuitry, or as part of a processor, ASIC, of FPGA. Moreover, video decoder 300 may include additional or alternative processors or processing circuitry to perform these and other functions.

Prediction processing unit 304 includes motion compensation unit 316 and intra-prediction unit 318. Prediction processing unit 304 may include additional units to perform prediction in accordance with other prediction modes. As examples, prediction processing unit 304 may include a palette unit, an intra-block copy unit (which may form part of motion compensation unit 316), an affine unit, a linear model (LM) unit, or the like. In other examples, video decoder 300 may include more, fewer, or different functional components.

CPB memory 320 may store video data, such as an encoded video bitstream, to be decoded by the components of video decoder 300. The video data stored in CPB memory 320 may be obtained, for example, from computer-readable medium 110 (FIG. 1). CPB memory 320 may include a CPB that stores encoded video data (e.g., syntax elements) from an encoded video bitstream. Also, CPB memory 320 may store video data other than syntax elements of a coded picture, such as temporary data representing outputs from the various units of video decoder 300. DPB 314 generally stores decoded pictures, which video decoder 300 may output and/or use as reference video data when decoding subsequent data or pictures of the encoded video bitstream.

CPB memory 320 and DPB 314 may be formed by any of a variety of memory devices, such as DRAM, including SDRAM, MRAM, RRAM, or other types of memory devices. CPB memory 320 and DPB 314 may be provided by the same memory device or separate memory devices. In various examples, CPB memory 320 may be on-chip with other components of video decoder 300, or off-chip relative to those components.

Additionally or alternatively, in some examples, video decoder 300 may retrieve coded video data from memory 120 (FIG. 1). That is, memory 120 may store data as discussed above with CPB memory 320. Likewise, memory 120 may store instructions to be executed by video decoder 300, when some or all of the functionality of video decoder 300 is implemented in software to be executed by processing circuitry of video decoder 300.

The various units shown in FIG. 4 are illustrated to assist with understanding the operations performed by video decoder 300. The units may be implemented as fixed-function circuits, programmable circuits, or a combination thereof. Similar to FIG. 3, fixed-function circuits refer to circuits that provide particular functionality, and are preset on the operations that can be performed. Programmable circuits refer to circuits that can be programmed to perform various tasks, and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, one or more of the units may be distinct circuit blocks (fixed-function or programmable), and in some examples, one or more of the units may be integrated circuits.

Video decoder 300 may include ALUs, EFUs, digital circuits, analog circuits, and/or programmable cores formed from programmable circuits. In examples where the operations of video decoder 300 are performed by software executing on the programmable circuits, on-chip or off-chip memory may store instructions (e.g., object code) of the software that video decoder 300 receives and executes.

Entropy decoding unit 302 may receive encoded video data from the CPB and entropy decode the video data to reproduce syntax elements. Prediction processing unit 304, inverse quantization unit 306, inverse transform processing unit 308, reconstruction unit 310, and filter unit 312 may generate decoded video data based on the syntax elements extracted from the bitstream.

In general, video decoder 300 reconstructs a picture on a block-by-block basis. Video decoder 300 may perform a reconstruction operation on each block individually (where the block currently being reconstructed, i.e., decoded, may be referred to as a "current block").

Entropy decoding unit 302 may entropy decode syntax elements defining quantized transform coefficients of a quantized transform coefficient block, as well as transform information, such as a quantization parameter (QP) and/or transform mode indication(s). Inverse quantization unit 306 may use the QP associated with the quantized transform coefficient block to determine a degree of quantization and, likewise, a degree of inverse quantization for inverse quantization unit 306 to apply. Inverse quantization unit 306 may, for example, perform a bitwise left-shift operation to inverse quantize the quantized transform coefficients. Inverse quantization unit 306 may thereby form a transform coefficient block including transform coefficients.

After inverse quantization unit 306 forms the transform coefficient block, inverse transform processing unit 308 may apply one or more inverse transforms to the transform coefficient block to generate a residual block associated with the current block. For example, inverse transform processing unit 308 may apply an inverse DCT, an inverse integer transform, an inverse Karhunen-Loeve transform (KLT), an inverse rotational transform, an inverse directional transform, or another inverse transform to the transform coefficient block.

Furthermore, prediction processing unit 304 generates a prediction block according to prediction information syntax elements that were entropy decoded by entropy decoding unit 302. For example, if the prediction information syntax elements indicate that the current block is inter-predicted, motion compensation unit 316 may generate the prediction block. In this case, the prediction information syntax elements may indicate a reference picture in DPB 314 from which to retrieve a reference block, as well as a motion vector identifying a location of the reference block in the reference picture relative to the location of the current block in the current picture. Motion compensation unit 316 may generally perform the inter-prediction process in a manner that is substantially similar to that described with respect to motion compensation unit 224 (FIG. 3).

As another example, if the prediction information syntax elements indicate that the current block is intra-predicted, intra-prediction unit 318 may generate the prediction block according to an intra-prediction mode indicated by the prediction information syntax elements. Again, intra-prediction unit 318 may generally perform the intra-prediction process in a manner that is substantially similar to that described with respect to intra-prediction unit 226 (FIG. 3). Intra-prediction unit 318 may retrieve data of neighboring samples to the current block from DPB 314.

Reconstruction unit 310 may reconstruct the current block using the prediction block and the residual block. For example, reconstruction unit 310 may add samples of the residual block to corresponding samples of the prediction block to reconstruct the current block.

Filter unit 312 may perform one or more filter operations on reconstructed blocks. For example, filter unit 312 may perform deblocking operations to reduce blockiness artifacts along edges of the reconstructed blocks. Operations of filter unit 312 are not necessarily performed in all examples.

Video decoder 300 may store the reconstructed blocks in DPB 314. For instance, in examples where operations of filter unit 312 are not performed, reconstruction unit 310 may store reconstructed blocks to DPB 314. In examples where operations of filter unit 312 are performed, filter unit 312 may store the filtered reconstructed blocks to DPB 314. As discussed above, DPB 314 may provide reference information, such as samples of a current picture for intra-prediction and previously decoded pictures for subsequent motion compensation, to prediction processing unit 304. Moreover, video decoder 300 may output decoded pictures (e.g., decoded video) from DPB 314 for subsequent presentation on a display device, such as display device 118 of FIG. 1.

DPB 314 may include a shared multi-layer DPB 315. As explained in more detail elsewhere in this this disclosure, video decoder 300 may be configured to store reference pictures for a plurality of layers in shared multi-layer DPB 315. Prior to decoding a current picture of an access unit of a first layer, video decoder 300 may perform a picture output and removal process on shared multi-layer DPB 315 to remove from shared multi-layer DPB 315 only some decoded pictures that belong to the first layer. After removing a last decoding unit of the current picture from CPB memory 320, video decoder 300 may perform a picture bumping process across all layers of shared multi-layer DPB 315. That is, video decoder 300 may perform a picture bumping process that is not limited to a specific layer, but instead, may bump pictures from layers other than the layer of the current picture.

In this manner, video decoder 300 represents an example of a video decoding device including a memory configured to store video data, and one or more processing units implemented in circuitry and configured to perform the techniques of this disclosure, including the techniques described in the claims section below.

Figure 5:
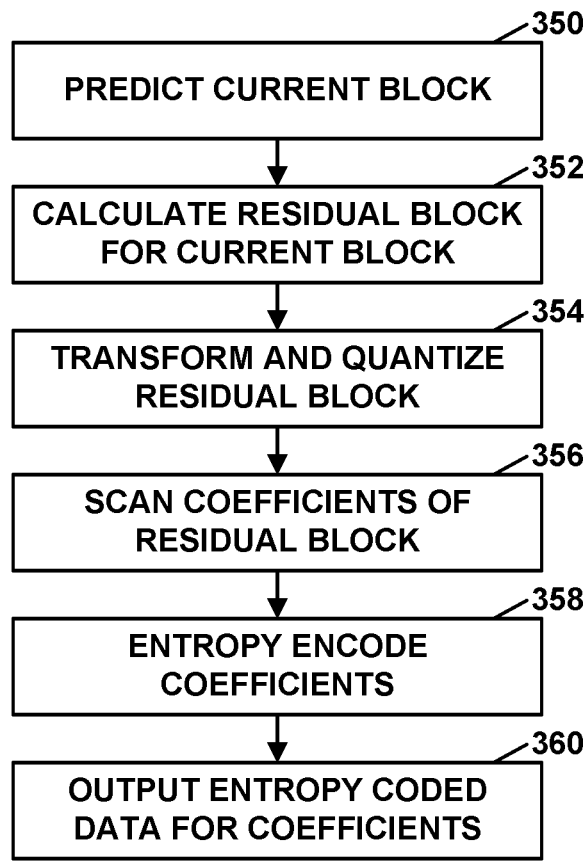
FIG. 5 is a flowchart illustrating a video encoding process.

FIG. 5 is a flowchart illustrating an example process for encoding a current block. The current block may comprise a current CU. Although described with respect to video encoder 200 (FIGS. 1 and 3), it should be understood that other devices may be configured to perform a process similar to that of FIG. 5.

In this example, video encoder 200 initially predicts the current block (350). For example, video encoder 200 may form a prediction block for the current block. Video encoder 200 may then calculate a residual block for the current block (352). To calculate the residual block, video encoder 200 may calculate a difference between the original, unencoded block and the prediction block for the current block. Video encoder 200 may then transform and quantize coefficients of the residual block (354). Next, video encoder 200 may scan the quantized transform coefficients of the residual block (356). During the scan, or following the scan, video encoder 200 may entropy encode the transform coefficients (358). For example, video encoder 200 may encode the transform coefficients using CAVLC or CABAC. Video encoder 200 may then output the entropy encoded data of the block (360).

Figure 6:
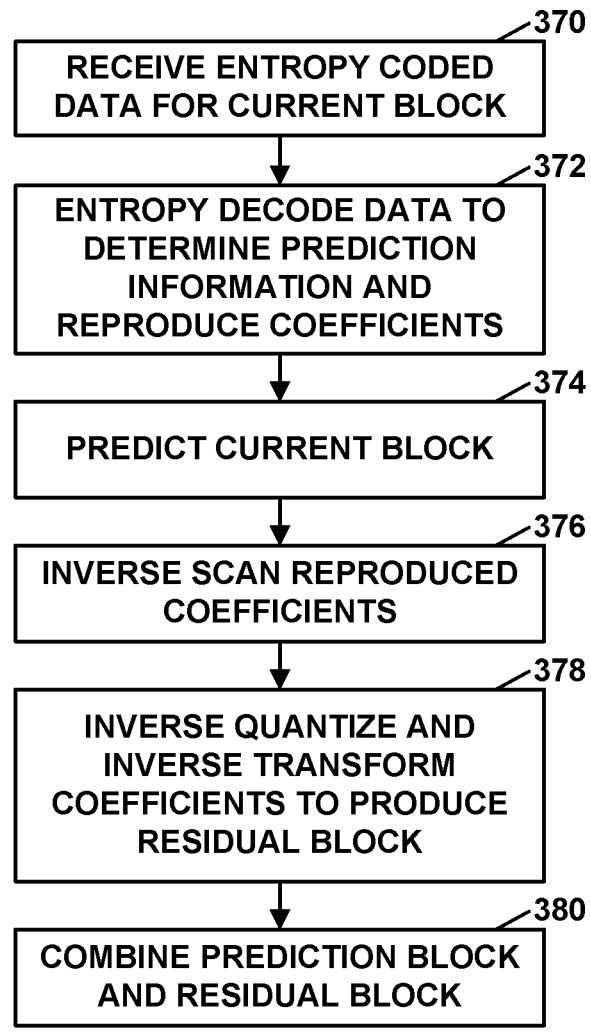
FIG. 6 is a flowchart illustrating a video decoding process.

FIG. 6 is a flowchart illustrating an example process for decoding a current block of video data. The current block may comprise a current CU. Although described with respect to video decoder 300 (FIGS. 1 and 4), it should be understood that other devices may be configured to perform a process similar to that of FIG. 6.

Video decoder 300 may receive entropy encoded data for the current block, such as entropy encoded prediction information and entropy encoded data for coefficients of a residual block corresponding to the current block (370). Video decoder 300 may entropy decode the entropy encoded data to determine prediction information for the current block and to reproduce coefficients of the residual block (372). Video decoder 300 may predict the current block (374), e.g., using an intra- or inter-prediction mode as indicated by the prediction information for the current block, to calculate a prediction block for the current block. Video decoder 300 may then inverse scan the reproduced coefficients (376), to create a block of quantized transform coefficients. Video decoder 300 may then inverse quantize and inverse transform the transform coefficients to produce a residual block (378). Video decoder 300 may ultimately decode the current block by combining the prediction block and the residual block (380).

Figure 7:
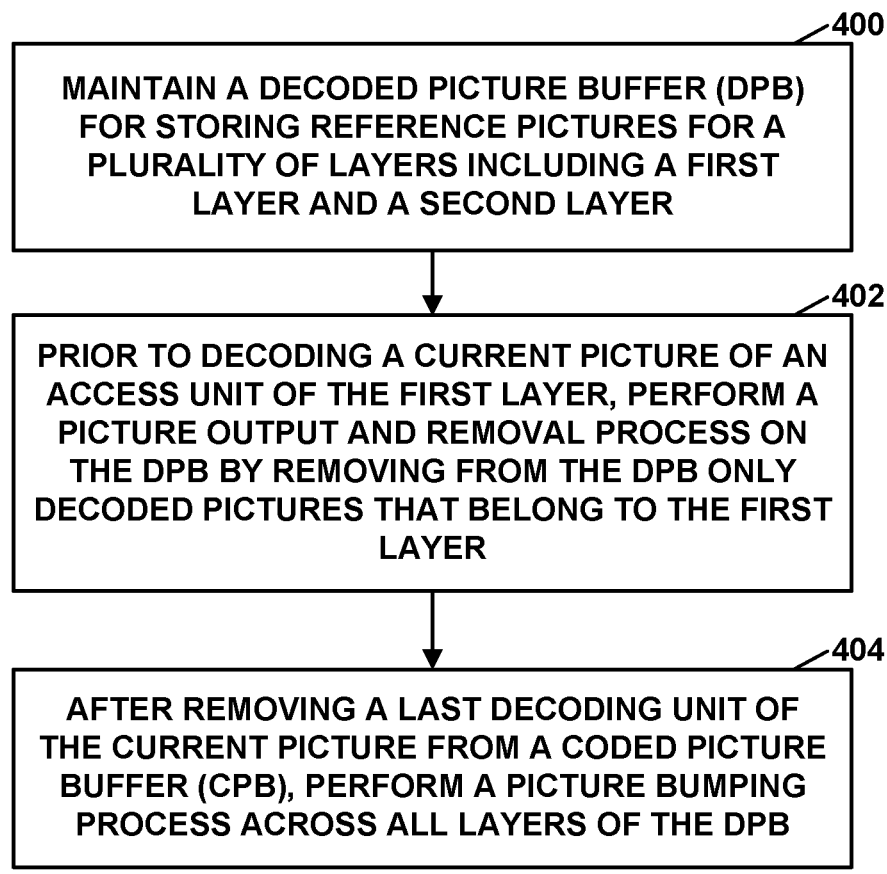
FIG. 7 is a flowchart illustrating a video decoding process.

FIG. 7 is a flowchart illustrating an example process for decoding video data. The techniques of FIG. 7 may be performed by a video decoder such as a video decoder 300 (FIGS. 1 and 4) or by the video decoding loop of a video encoder such as video encoder 200 (FIGS. 1 and 3).

The video decoder maintains a DPB for storing reference pictures for a plurality of layers (400). The DPB stores previously decoded pictures. The plurality of layers include at least a first layer and a second layer.

Prior to decoding a current picture of an access unit of the first layer, the video decoder performs a picture output and removal process on the DPB by removing from the DPB only decoded pictures that belong to the first layer (402). The video decoder may, for example, perform the picture output and removal process on the DPB prior to decoding the current picture of the first layer and after parsing a slice header for a slice of the current picture. The video decoder may, for example, perform the picture output and removal process on the DPB in response to removing a first decoding unit of the current picture from a CPB. The CPB may store encoded multi-layer video data for decoding.

After removing a last decoding unit of the current picture from the CPB, the video decoder performs a picture bumping process across all layers of the DPB (404). To perform the picture bumping process across all layers of the DPB, the video decoder may remove at least one picture of the second layer from the DPB. To perform the picture bumping process across all layers of the DPB, the video decoder may, for example, remove from the DPB a reference picture that is marked as not needed for output and marked as unused for reference.

The video decoder may identify a reference picture in the DPB; identify a prediction block for a current block of the current picture in the reference picture; decode the current block based on the prediction block; and output a decoded version of the current picture, wherein the decoded version of the current picture includes a decoded version of the current block.

The following clauses represent examples of the techniques and devices described above.

Clause 1: A device for decoding multi-layer video data includes a memory configured to store multi-layer video data; one or more processors implemented in circuitry and configured to: maintain a decoded picture buffer (DPB) for storing reference pictures for a plurality of layers, wherein the plurality of layers comprise at least a first layer and a second layer; prior to decoding a current picture of an access unit of the first layer, perform a picture output and removal process on the DPB, wherein to perform the picture output and removal process on the DPB, the one or more processors are further configured to remove from the DPB only decoded pictures that belong to the first layer; and after removing a last decoding unit of the current picture from a coded picture buffer (CPB), perform a picture bumping process across all layers of the DPB.

Clause 2: The device of clause 1, wherein to perform the picture output and removal process on the DPB, the one or more processors are further configured to perform the picture output and removal process on the DPB prior to decoding the current picture of the first layer and after parsing a slice header for a slice of the current picture.

Clause 3: The device of any of clauses 1 and 2, wherein to perform the picture output and removal process on the DPB, the one or more processors are further configured to perform the picture output and removal process on the DPB in response to removing a first decoding unit of the current picture from the CPB.

Clause 4: The device of any of clauses 1 through 3, wherein to perform the picture bumping process across all layers of the DPB, the one or more processors are further configured to remove from the DPB a reference picture that is marked as not needed for output and marked as unused for reference.

Clause 5: The device of any of clauses 1 through 4, wherein to perform the picture bumping process across all layers of the DPB, the one or more processors are further configured to remove at least one picture of the second layer from the DPB.

Clause 6: The device of any of clauses 1 through 5, wherein the one or more processors are further configured to: identify a reference picture in the DPB; identify a prediction block for a current block of the current picture in the reference picture; decode the current block based on the prediction block; and output a decoded version of the current picture, wherein the decoded version of the current picture includes a decoded version of the current block.

Clause 7: The device of any of clauses 1 through 6, wherein the DPB is configured to store previously decoded pictures, and wherein the CPB is configured to store encoded multi-layer video data.

Clause 8: The device of any of clauses 1 through 7, wherein the one or more processors are further configured to maintain the DPB and the CPB in the memory.

Clause 9: The device of any of clauses 1 through 8, wherein the device comprises a wireless communication device, further comprising a receiver configured to receive encoded multi-layer video data.

Clause 10: The device of clause 9, wherein the wireless communication device comprises a telephone handset and wherein the receiver is configured to demodulate, according to a wireless communication standard, a signal comprising the encoded multi-layer video data.

Clause 11: The device of any of clauses 1 through 8, wherein the device comprises a wireless communication device, further comprising a transmitter configured to transmit encoded multi-layer video data.

Clause 12: The device of clause 11, wherein the wireless communication device comprises a telephone handset and wherein the transmitter is configured to modulate, according to a wireless communication standard, a signal comprising the encoded multi-layer video data.

Clause 13: The device of any of clauses 1 through 12, further includes a display configured to display decoded multi-layer video data comprising a decoded version of the current picture.

Clause 14: The device of any of clauses 1 through 13, wherein the device comprises one or more of a camera, a computer, a mobile device, a broadcast receiver device, or a set-top box.

Clause 15: A method of decoding multi-layer video data includes maintaining a decoded picture buffer (DPB) for storing reference pictures for a plurality of layers, wherein the plurality of layers comprise at least a first layer and a second layer; prior to decoding a current picture of an access unit of the first layer, performing a picture output and removal process on the DPB, wherein performing the picture output and removal process on the DPB comprises removing from the DPB only decoded pictures that belong to the first layer; and after removing a last decoding unit of the current picture from a coded picture buffer (CPB), performing a picture bumping process across all layers of the DPB.

Clause 16: The method of clause 15, wherein performing the picture output and removal process on the DPB comprises performing the picture output and removal process on the DPB prior to decoding the current picture of the first layer and after parsing a slice header for a slice of the current picture.

Clause 17: The method of any of clauses 15 and 16, wherein performing the picture output and removal process on the DPB comprises performing the picture output and removal process on the DPB in response to removing a first decoding unit of the current picture from the CPB.

Clause 18: The method of any of clauses 15 through 17, wherein performing the picture bumping process across all layers of the DPB comprises: removing from the DPB a reference picture that is marked as not needed for output and marked as unused for reference.

Clause 19: The method of any of clauses 15 through 18, wherein performing the picture bumping process across all layers of the DPB comprises removing at least one picture of the second layer from the DPB.

Clause 20: The method of any of clauses 15 through 19, further includes identifying a reference picture in the DPB; identifying a prediction block for a current block of the current picture in the reference picture; decoding the current block based on the prediction block; outputting a decoded version of the current picture, wherein the decoded version of the current picture includes a decoded version of the current block.

Clause 21: The method of clause 20, further includes displaying the decoded version of the current picture.

Clause 22: The method of any of clauses 15 through 21, wherein the DPB is configured to store previously decoded pictures, and wherein the CPB is configured to store encoded multi-layer video data.

Clause 23: The method of any of clauses 15 through 20 or 22, wherein the method of decoding is performed as part of an encoding process.

Clause 24: A computer-readable storage medium storing instructions that when executed by one or more processors cause the one or more processors to: maintain a decoded picture buffer (DPB) for storing reference pictures for a plurality of layers, wherein the plurality of layers comprise at least a first layer and a second layer; prior to decoding a current picture of an access unit of the first layer, perform a picture output and removal process on the DPB, wherein to perform the picture output and removal process on the DPB the instructions cause the one or more processors to remove from the DPB only decoded pictures that belong to the first layer; and after removing a last decoding unit of the current picture from a coded picture buffer (CPB), perform a picture bumping process across all layers of the DPB.

Clause 25: The computer-readable storage medium of clause 24, wherein to perform the picture output and removal process on the DPB, the instructions cause the one or more processors to perform the picture output and removal process on the DPB prior to decoding the current picture of the first layer and after parsing a slice header for a slice of the current picture.

Clause 26: The computer-readable storage medium of any of clauses 24 and 25, wherein to perform the picture output and removal process on the DPB, the instructions cause the one or more processors to perform the picture output and removal process on the DPB in response to removing a first decoding unit of the current picture from the CPB.

Clause 27: The computer-readable storage medium of any of clauses 24 through 26, wherein to perform the picture bumping process across all layers of the DPB, the instructions cause the one or more processors to remove from the DPB a reference picture that is marked as not needed for output and marked as unused for reference.

Clause 28: The computer-readable storage medium of any of clauses 24 through 27, wherein to perform the picture bumping process across all layers of the DPB, the instructions cause the one or more processors to remove at least one picture of the second layer from the DPB.

Clause 29: The computer-readable storage medium of any of clauses 24 through 28, wherein the instructions further cause the one or more processors to: identify a reference picture in the DPB; identify a prediction block for a current block of the current picture in the reference picture; decode the current block based on the prediction block; output a decoded version of the current picture, wherein the decoded version of the current picture includes a decoded version of the current block.

Clause 30: The computer-readable storage medium of any of clauses 24 through 29, wherein the DPB is configured to store previously decoded pictures, and wherein the CPB is configured to store encoded multi-layer video data.

Clause 31: An apparatus for decoding multi-layer video data includes means for maintaining a decoded picture buffer (DPB) for storing reference pictures for a plurality of layers, wherein the plurality of layers comprise at least a first layer and a second layer; means for performing a picture output and removal process on the DPB prior to decoding a current picture of an access unit of the first layer, wherein performing the picture output and removal process on the DPB comprises removing from the DPB only decoded pictures that belong to the first layer; and means for performing a picture bumping process across all layers of the DPB after removing a last decoding unit of the current picture from a coded picture buffer (CPB).

Clause 32: The apparatus of clause 31, wherein the means for performing the picture output and removal process on the DPB comprises means for performing the picture output and removal process on the DPB prior to decoding the current picture of the first layer and after parsing a slice header for a slice of the current picture.

Clause 33: The apparatus of any of clauses 31 and 32, wherein the means for performing the picture output and removal process on the DPB comprises means for performing the picture output and removal process on the DPB in response to removing a first decoding unit of the current picture from the CPB.

Clause 34: The apparatus of any of clauses 31 through 33, wherein the means for performing the picture bumping process across all layers of the DPB comprises: means for removing from the DPB a reference picture that is marked as not needed for output and marked as unused for reference.

Clause 35: The apparatus of any of clauses 31 through 34, wherein the means for performing the picture bumping process across all layers of the DPB comprises means for removing at least one picture of the second layer from the DPB.

Clause 36: The apparatus of any of clauses 31 through 35, further includes means for identifying a reference picture in the DPB; means for identifying a prediction block for a current block of the current picture in the reference picture; means for decoding the current block based on the prediction block; means for outputting a decoded version of the current picture, wherein the decoded version of the current picture includes a decoded version of the current block.

Clause 37: The apparatus of any of clauses 31 through 36, wherein the DPB is configured to store previously decoded pictures, and wherein the CPB is configured to store encoded multi-layer video data.

Clause 38: The apparatus of any of clauses 31 through 37, wherein the apparatus for decoding the multi-layer video data is part of a video encoder.

Clause 39: A method of decoding video data includes maintaining a decoded picture buffer (DPB) for storing reference pictures for a plurality of layers, wherein the DPB comprises a sub-DPB for storing reference pictures for a layer of the plurality of layers; decoding a picture of the video data; and storing a copy of the decoded picture as a reference picture in the DPB.

Clause 40: The method of clause 39, further includes determining a fullness of the sub-DPB.

Clause 41: The method of clause 39 or 40, further includes determining a fullness of the DPB.

Clause 42: The method of any of clauses 39-41, further includes initializing a fullness of the sub-DPB to zero in response to a first picture of a video sequence being parsed.

Clause 43: The method of any of clauses 39-41, further includes initializing a fullness of the sub-DPB to zero in response to a first slice of a CLVSS picture 0 with a lowest nuh_layer_id being parsed.

Clause 44: The method of any of clauses 39-43, further includes marking pictures stored in the sub-DPB with a state.

Clause 45: The method of any of clauses 39-44, wherein the DPB comprises a second sub-DPB for storing reference pictures for a second layer of the plurality of layers.

Clause 46: The method of any of clauses 39-45, wherein the method of decoding is performed as part of an encoding process.

Clause 47: A device for coding video data, the device comprising one or more means for performing the method of any of clauses 39-46.

Clause 48: The device of clause 47, wherein the one or more means comprise one or more processors implemented in circuitry.

Clause 49: The device of clause 46 or 47, further comprising a memory to store the video data.

Clause 50: The device of any of clauses 47-49, further comprising a display configured to display decoded video data.

Clause 51: The device of any of clauses 47-50, wherein the device comprises one or more of a camera, a computer, a mobile device, a broadcast receiver device, or a set-top box.

Clause 52: The device of any of clauses 47-51, wherein the device comprises a video decoder.

Clause 53: The device of any of clauses 47-52, wherein the device comprises a video encoder.

Clause 54: A computer-readable storage medium having stored thereon instructions that, when executed, cause one or more processors to perform the method of any of clauses 39-46.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable gate arrays (FPGAs), or other equivalent integrated or discrete logic circuitry. Accordingly, the terms "processor" and "processing circuitry," as used herein may refer to any of the foregoing structures or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A device for decoding multi-layer video data, the device comprising:
a memory configured to store multi-layer video data;
one or more processors implemented in circuitry and configured to:
maintain a decoded picture buffer (DPB) for storing reference pictures for a plurality of layers, wherein the plurality of layers comprise at least a first layer having a first layer identification (ID) value and a second layer having a second layer ID value and the DPB comprises a common DPB shared across all of the plurality of layers;
prior to decoding a current picture of an access unit of the first layer, perform a picture output and removal process on the common DPB, wherein to perform the picture output and removal process on the common DPB, the one or more processors are further configured to remove from the common DPB only decoded pictures that have the first layer ID value and leave in the common DPB decoded pictures that have the second layer ID value; and
after removing a last decoding unit of the current picture from a coded picture buffer (CPB), perform a picture bumping process across all layers of the common DPB, wherein to perform the picture bumping process across all layers of the common DPB, the one or more processors are configured to remove from the common DPB decoded pictures that have the first layer ID value corresponding to the first layer and decoded pictures that have the second layer ID corresponding to the second layer.

2. The device of claim 1, wherein to perform the picture output and removal process on the common DPB, the one or more processors are further configured to perform the picture output and removal process on the common DPB prior to decoding the current picture of the first layer and after parsing a slice header for a slice of the current picture.

3. The device of claim 1, wherein to perform the picture output and removal process on the common DPB, the one or more processors are further configured to perform the picture output and removal process on the common DPB in response to removing a first decoding unit of the current picture from the CPB.

4. The device of claim 1, wherein to perform the picture bumping process across all layers of the common DPB, the one or more processors are further configured to remove from the common DPB a reference picture that is marked as not needed for output and marked as unused for reference.

5. The device of claim 1, wherein to perform the picture bumping process across all layers of the common DPB, the one or more processors are further configured to remove at least one picture of the second layer from the common DPB.

6. The device of claim 1, wherein the one or more processors are further configured to:
identify a reference picture in the common DPB;
identify a prediction block for a current block of the current picture in the reference picture;
decode the current block based on the prediction block; and
output a decoded version of the current picture, wherein the decoded version of the current picture includes a decoded version of the current block.

7. The device of claim 1, wherein the common DPB is configured to store previously decoded pictures, and wherein the CPB is configured to store encoded multi-layer video data.

8. The device of claim 1, wherein the one or more processors are further configured to maintain the common DPB and the CPB in the memory.

9. The device of claim 1, wherein the device comprises a wireless communication device, further comprising a receiver configured to receive encoded multi-layer video data.

10. The device of claim 9, wherein the wireless communication device comprises a telephone handset and wherein the receiver is configured to demodulate, according to a wireless communication standard, a signal comprising the encoded multi-layer video data.

11. The device of claim 1, wherein the device comprises a wireless communication device, further comprising a transmitter configured to transmit encoded multi-layer video data.

12. The device of claim 11, wherein the wireless communication device comprises a telephone handset and wherein the transmitter is configured to modulate, according to a wireless communication standard, a signal comprising the encoded multi-layer video data.

13. The device of claim 1, further comprising:
a display configured to display decoded multi-layer video data comprising a decoded version of the current picture.

14. The device of claim 1, wherein the device comprises one or more of a camera, a computer, a mobile device, a broadcast receiver device, or a set-top box.

15. A method of decoding multi-layer video data, the method comprising:
maintaining a decoded picture buffer (DPB) for storing reference pictures for a plurality of layers, wherein the plurality of layers comprise at least a first layer having a first layer identification (ID) value and a second layer having a second layer ID value and the DPB comprises a common DPB shared across all of the plurality of layers;
prior to decoding a current picture of an access unit of the first layer, performing a picture output and removal process on the common DPB, wherein performing the picture output and removal process on the common DPB comprises removing from the common DPB only decoded pictures that have the first layer ID value and leave in the common DPB decoded pictures that have the second layer ID value; and
after removing a last decoding unit of the current picture from a coded picture buffer (CPB), performing a picture bumping process across all layers of the common DPB, wherein performing the picture bumping process across all layers of the common DPB comprises removing from the common DPB decoded pictures that have the first layer ID value corresponding to the first layer and decoded pictures that have the second layer ID corresponding to the second layer.

16. The method of claim 15, wherein performing the picture output and removal process on the common DPB comprises performing the picture output and removal process on the common DPB prior to decoding the current picture of the first layer and after parsing a slice header for a slice of the current picture.

17. The method of claim 15, wherein performing the picture output and removal process on the common DPB comprises performing the picture output and removal process on the common DPB in response to removing a first decoding unit of the current picture from the CPB.

18. The method of claim 15, wherein performing the picture bumping process across all layers of the common DPB comprises:
removing from the common DPB a reference picture that is marked as not needed for output and marked as unused for reference.

19. The method of claim 15, wherein performing the picture bumping process across all layers of the common DPB comprises removing at least one picture of the second layer from the common DPB.

20. The method of claim 15, further comprising:
identifying a reference picture in the common DPB;
identifying a prediction block for a current block of the current picture in the reference picture;
decoding the current block based on the prediction block;
outputting a decoded version of the current picture, wherein the decoded version of the current picture includes a decoded version of the current block.

21. The method of claim 20, further comprising:
displaying the decoded version of the current picture.

22. The method of claim 15, wherein the common DPB is configured to store previously decoded pictures, and wherein the CPB is configured to store encoded multi-layer video data.

23. The method of claim 15, wherein the method of decoding is performed as part of an encoding process.

24. A non-transitory computer-readable storage medium storing instructions that when executed by one or more processors cause the one or more processors to:
maintain a decoded picture buffer (DPB) for storing reference pictures for a plurality of layers, wherein the plurality of layers comprise at least a first layer having a first layer identification (ID) value and a second layer having a second layer ID value and the DPB comprises a common DPB shared across all of the plurality of layers;
prior to decoding a current picture of an access unit of the first layer, perform a picture output and removal process on the common DPB, wherein to perform the picture output and removal process on the common DPB, the one or more processors are further configured to remove from the common DPB only decoded pictures that have the first layer ID value and leave in the common DPB decoded pictures that have the second layer ID value; and
after removing a last decoding unit of the current picture from a coded picture buffer (CPB), perform a picture bumping process across all layers of the common DPB, wherein to perform the picture bumping process across all layers of the common DPB, the one or more processors are configured to remove from the common DPB decoded pictures that have the first layer ID value corresponding to the first layer and decoded pictures that have the second layer ID corresponding to the second layer.

25. An apparatus for decoding multi-layer video data, the apparatus comprising:
means for maintaining a decoded picture buffer (DPB) for storing reference pictures for a plurality of layers, wherein the plurality of layers comprise at least a first layer having a first layer identification (ID) value and a second layer having a second layer ID value and the DPB comprises a common DPB shared across all of the plurality of layers;
means for performing a picture output and removal process on the common DPB prior to decoding a current picture of an access unit of the first layer, wherein the means for performing the picture output and removal process on the common DPB comprises means for removing from the common DPB only decoded pictures that have the first layer ID value while leaving in the common DPB decoded pictures that have the second layer ID value; and
means for performing a picture bumping process across all layers of the common DPB after removing a last decoding unit of the current picture from a coded picture buffer (CPB), wherein the means for performing the picture bumping process across all layers of the common DPB comprises means for removing from the common DPB decoded pictures that have the first layer ID value corresponding to the first layer and decoded pictures that have the second layer ID corresponding to the second layer.

26. The device of claim 1, wherein:
the one or more processors are further configured to maintain a value indicative of a fullness of the common DPB, and
to perform the picture bumping process across all layers, the one or more processors are further configured to decrement the value indicative of the fullness of the common DPB in response to a reference picture of the second layer being marked as unused for reference.

* * * * *